United States Patent
Takahashi et al.

(10) Patent No.: US 8,686,605 B2
(45) Date of Patent: Apr. 1, 2014

(54) ROTARY ELECTRIC MACHINE WITH IMPROVED COOLING CAPABILITY

(75) Inventors: Takutou Takahashi, Nishio (JP); Kazunori Uchiyama, Okazaki (JP); Naoki Hakamada, Anjo (JP); Masahiro Seguchi, Obu (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 154 days.

(21) Appl. No.: 13/167,919

(22) Filed: Jun. 24, 2011

(65) Prior Publication Data
US 2011/0316367 A1 Dec. 29, 2011

(30) Foreign Application Priority Data

Jun. 24, 2010 (JP) ................................ 2010-143450
Sep. 21, 2010 (JP) ................................ 2010-210815
May 18, 2011 (JP) ................................ 2011-111759

(51) Int. Cl.
*H02K 9/19* (2006.01)
*H02K 9/00* (2006.01)

(52) U.S. Cl.
USPC .............................................. 310/54; 310/59

(58) Field of Classification Search
USPC ........................................ 310/52, 54, 58, 59
IPC ................................................. H02K 9/00,9/19
See application file for complete search history.

(56) References Cited

U.S. PATENT DOCUMENTS 6,486,586 B2 * 11/2002 Higashino et al. ............ 310/263
6,621,185 B2 * 9/2003 Riess ............................... 310/54
8,093,770 B1 * 1/2012 Berhan .............................. 310/54
2005/0151429 A1 * 7/2005 Taketsuna et al. ............... 310/54
2010/0045125 A1 * 2/2010 Takenaka et al. ................ 310/54

FOREIGN PATENT DOCUMENTS

| JP | 2004180376 A | * | 6/2004 | ............ | H02K 9/19 |
| JP | 2005-012961 | | 1/2005 | | |
| JP | 2005229672 A | * | 8/2005 | ............ | H02K 9/19 |
| JP | 2006005984 A | * | 1/2006 | | |

OTHER PUBLICATIONS

Machine Translation, JP 2004180376 A, Jun. 24, 2004.*
Machine Translation, JP 2005229672 A, Aug. 25, 2005.*
Machine Translation, JP 2006005984 A, Jan. 5, 2006.*
Oxford English Dictionary, Definition of term "Mesh", Feb. 14, 2013.*

* cited by examiner

*Primary Examiner* — John K Kim
*Assistant Examiner* — Thomas Truong
(74) *Attorney, Agent, or Firm* — Nixon & Vanderhye P.C.

(57) ABSTRACT

In a rotary electric machine, a stator coil includes in-slot portions each contained in a corresponding one of slots of a stator core. The stator coil includes turn portions each connecting one end of a corresponding one of the in-slot portions projecting from one axial end of the stator core with one end of a corresponding alternative one of the in-slot portions projecting the one axial end of the stator core. The turn portions provide an end portion of the stator coil. A coolant guide is placed to cover a circumferential outer part of the end portion of the stator coil from radially outside thereof and provided with holes therethrough. The coolant guide guides a coolant therealong in a circumferential direction of the end portion of the stator coil while guiding, through the holes, a part of the coolant to the end portion of the stator coil.

20 Claims, 28 Drawing Sheets

CIRCUMFERENTIAL DIRECTION
(OIL FLOW DIRECTION)

CIRCUMFERENTIAL DIRECTION
(OIL FLOW DIRECTION)

CIRCUMFERENTIAL DIRECTION
(OIL FLOW DIRECTION)

CIRCUMFERENTIAL DIRECTION
(OIL FLOW DIRECTION)

INSTALLATION DIRECTION (a)

(b)

ROTARY ELECTRIC MACHINE WITH IMPROVED COOLING CAPABILITY

CROSS REFERENCE TO RELATED APPLICATIONS

This application is based on Japanese Patent Applications 2010-143450, 2010-210815, and 2011-111759 filed on Jun. 24, 2010, Sep. 21, 2010, and May 18, 2011, respectively. This application claims the benefit of priority from the Japanese Patent Applications, so that the descriptions of which are all incorporated herein by reference.

TECHNICAL FIELD

The present disclosure relates to rotary electric machines for use in home electric appliances, industrial devices, motor vehicles, and so on, and, more particularly, to such rotary electric machines having an improved cooling capability thereof.

BACKGROUND

Rotary electric machines, operable as motors and power generators, include, for example, a rotor rotatable about a preset axis and a stator disposed around the rotor. The stator is comprised of a stator core and a stator coil provided in the stator core. One or more conductive wires are wound in the stator core in many turns to form the stator coil. Both portions (many turn portions) of the stator coil, axially projecting from the stator core, provide cylindrical coil ends.

When current flows through the stator coil, heat is generated from the stator core and/or the stator coil. The generated heat affects on magnetic flux generated in the rotary electric machine; this may reduce the efficiency of the rotary electric machine. In light of this problem, rotary electric machines with specific cooling structures have been proposed, an example of which is disclosed in Japanese Patent Application Publication No. 2005-12961.

An example of these cooling structures is configured such that an insulative coolant, such as oil, flows along the stator coil. For example, the aforementioned Patent Application Publication discloses such a rotary electric machine disposed in a vehicle with its axial direction orthogonal to the height direction of the vehicle. The rotary electric machine is comprised of a groove formed in the outer circumferential surface of each coil end. When a coolant, such as oil, is supplied into a top portion of the groove, the groove guides the coolant therealong so that the coolant falls along the outer circumferential surface of each coil end.

SUMMARY

The stator coil of one type of these rotary electric machines consists of the assembly of a plurality of conductor segments. In order to manufacture the stator coil, a cylindrical stator core having a plurality of slots circumferentially arranged at equal pitches, and the plurality of conductor segments are provided. Each of the plurality of conductor segments consists of a pair of in-slot portions and a U- or V-shaped turn portion such that each in-slot portion extends at its one end from a corresponding one end of the turn portion.

One of the in-slot portions of one conductor segment is inserted into a corresponding slot of the stator core and the other of the in-slot portions is inserted into a corresponding slot of the stator core from one axial end side of the stator core so that the other ends of the in-slot portions project from the corresponding slots of the stator core. These other ends of the in-slot portions projecting out of the corresponding slots (the stator core) will be referred to as "projecting end portions" hereinafter.

Thereafter, each of the projecting end portions of the one conductor segment is bent to be inclined outward by a predetermined electric angle with respect to the axial direction of a corresponding slot. After the bending, the tip of each of the projecting end portions of the conductor segment is joined by, for example, welding to the tip of a corresponding one of the projecting end portions of an alternative conductor segment inserted in corresponding slots in the same manner as the one conductor segment. This manufactures the stator coil wound in the stator core.

As described above, each axial end of a stator coil is comprised of many turn portions of one or more conductor wires, so that there may be spaces between adjacent turn portions of the one or more conductor wires. For this reason, even if such a groove is formed in at least one half part of the outer circumferential surface of each coil end, a coolant, such as oil, may fall downward through the spaces between adjacent turn portions of the one or more conductor wires. This may make it difficult to guide the coolant along the outer circumferential surface of each coil end, deteriorating the cooling capability of the rotary electric machine for the stator coil.

Particularly, if the stator coil is comprised of the assembly of a plurality of conductor segments set forth above, spaces between adjacent turn portions, which include joined portions, of the conductor segments of the one coil end are normally wider than the spaces between adjacent turn portions of one or more conductor wires of a stator coil. This may increase the risk of the deterioration of the cooling capability of the rotary electric machine for the stator coil due to the drop of the coolant.

In view of the circumstances set forth above, an aspect of the present disclosure seeks to provide rotary electric machines designed to solve at least one of the problems set forth above.

Specifically, an alternative aspect of the present disclosure aims to provide such rotary electric machines each having an improved cooling capability.

According to one aspect of the present disclosure, there is provided a rotary electric machine. The rotary electric machine includes a rotor, and a stator. The stator includes a stator core in which the rotor is installed to be rotatable about a preset rotation axis. The stator core has a plurality of slots in a circumferential direction of the stator core about the rotation axis. The stator includes a stator coil. The stator coil includes a plurality of in-slot portions each contained in a corresponding one of the plurality of slots, and a plurality of turn portions each connecting one end of a corresponding one of the plurality of in-slot portions projecting from one axial end of the stator core with one end of a corresponding alternative one of the plurality of in-slot portions projecting the one axial end of the stator core. The plurality of turn portions provide an end portion of the stator coil. The rotary electric machine includes a coolant guide placed to cover at least a circumferential outer part of the end portion of the stator coil from radially outside of the end portion and provided with a plurality of holes therethrough. The coolant guide is configured to guide a coolant therealong in a circumferential direction of the end portion of the stator coil while guiding, through the plurality of holes, a part of the coolant as a first coolant to the end portion of the stator coil.

With the one aspect of the present invention, the coolant is guided along the coolant guide in a circumferential direction of the end portion of the stator coil with a part of the coolant being guided through the plurality of holes of the coolant guide to the end portion of the stator coil. This allows a coolant, which has been passed through each hole, to flow through a pass between the coolant guide and the end portion of the stator coil by the interfacial tension between the coolant and the coolant guide and by the interfacial tension between the coolant and the end portion of the stator coil. This makes the coolant sufficiently contact with the end portion of the stator coil, thus maintaining the cooling capability of the rotary electric machine for the stator coil at a high level.

Particularly, even if the stator coil of the rotary electric machine consists of the assembly of a plurality of conductor segments with many conductor spaces between adjacent U-shaped turn portions and those between adjacent joined portions, the aspect of the present invention makes parts of the coolant flow through the pass between the coolant guide and the end portion of the stator coil while reducing alternative parts of the coolant from dropping the conductor spaces. Thus, it is possible to provide a lot of rotary electric machines, each of which includes the stator coil consisting of the assembly of a plurality of conductor segments, with an improved cooling capability for the stator coil.

In addition, the rotary electric machine according to the one aspect of the present invention easily guides the coolant in a circumferential direction of the end portion of the stator coil while allowing a part of the coolant to be in contact with the end portion of the stator coil. Thus, it is possible to maintain, at a high level, the cooling capability of the rotary electric machine for the end portion of the stator coil throughout its circumferential direction.

According to an alternative aspect of the present disclosure, there is provided a rotary electric machine. The rotary electric machine includes a rotor, and a stator. The stator includes a stator core in which the rotor is installed to be rotatable about a preset rotation axis. The stator core has a plurality of slots in a circumferential direction of the stator core about the rotation axis. The stator includes a stator coil. The stator coil includes a plurality of in-slot portions each contained in a corresponding one of the plurality of slots, and a plurality of turn portions each connecting one end of a corresponding one of the plurality of in-slot portions projecting from one axial end of the stator core with one end of a corresponding alternative one of the plurality of in-slot portions projecting the one axial end of the stator core. The plurality of turn portions provide an end portion of the stator coil. The rotary electric machine includes a coolant recovery member placed to cover at least a circumferential inner part of the end portion of the stator coil and configured to recover a part of a coolant that has passed through the end portion of the stator coil, and to allow the recovered part of the coolant to flow therealong.

With the alternative aspect of the present disclosure, when a part of the coolant passes through the end portion of the stator coil, the part of the coolant is recovered by the coolant recovery member. Thereafter, the recovered part of the coolant flows along the coolant recovery member while being in contact with the end portion of the stator coil from radially inward thereof. That is, the rotary electric machine according to the alternative aspect of the present disclosure uses a part of the coolant, which has passed through the end portion of the stator coil, to efficiently cool the end portion of the stator coil.

According to a further aspect of the present disclosure, there is provided a rotary electric machine. The rotary electric machine includes a rotor, and a stator. The stator includes a stator core in which the rotor is installed to be rotatable about a preset rotation axis. The stator core has a plurality of slots in a circumferential direction of the stator core about the rotation axis. The stator includes a stator coil. The stator coil includes a plurality of in-slot portions each contained in a corresponding one of the plurality of slots, and a plurality of turn portions each connecting one end of a corresponding one of the plurality of in-slot portions projecting from one axial end of the stator core with one end of a corresponding alternative one of the plurality of in-slot portions projecting the one axial end of the stator core. The plurality of turn portions provide an end portion of the stator coil. The rotary electric machine includes a coolant guide placed to cover at least a circumferential outer part of the end portion of the stator coil from radially outside of the end portion and configured to guide a coolant therealong with a first resistance of flow, and guide a part of the coolant therethrough with a second resistance of flow, the second resistance of flow being greater than the first resistance of flow.

Because the second resistance of flow of the part of the coolant guided through the coolant guide is greater than the first resistance of flow of the coolant guided along the coolant guide, the coolant is sufficiently distributed circumferentially throughout the end portion of the stator coil. In addition, even if the coolant has a supply pressure and its gravity, a part of the coolant is guided through the coolant guide with its supply pressure and gravity being reduced by the second resistance of flow. This allows some of the coolant, which has passed through the coolant guide, to flow through a pass between the coolant guide and the end portion of the stator coil with the coolant being in contact with the end portion of the stator coil. Thus, it is possible to improve the cooling capability of the rotary electric machine for the stator coil.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1A:
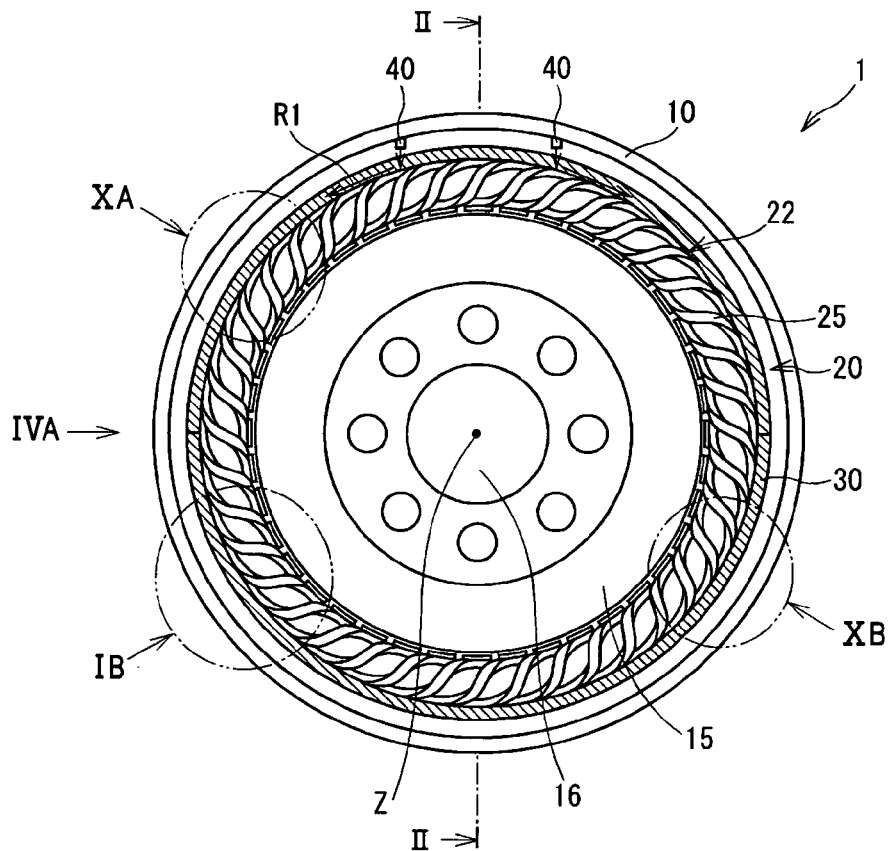
FIG. 1A is a schematic axial end view of a rotary electric machine according to the first embodiment of the present disclosure.

Embodiments of the present disclosure will be described hereinafter with reference to the accompanying drawings. In the drawings, identical reference characters are utilized to identify corresponding identical components. Note that, in order to simply illustrate the structure and operations of the embodiments, hatching is omitted in illustration in some of the accompanying drawings.

First Embodiment

Figure 1B:
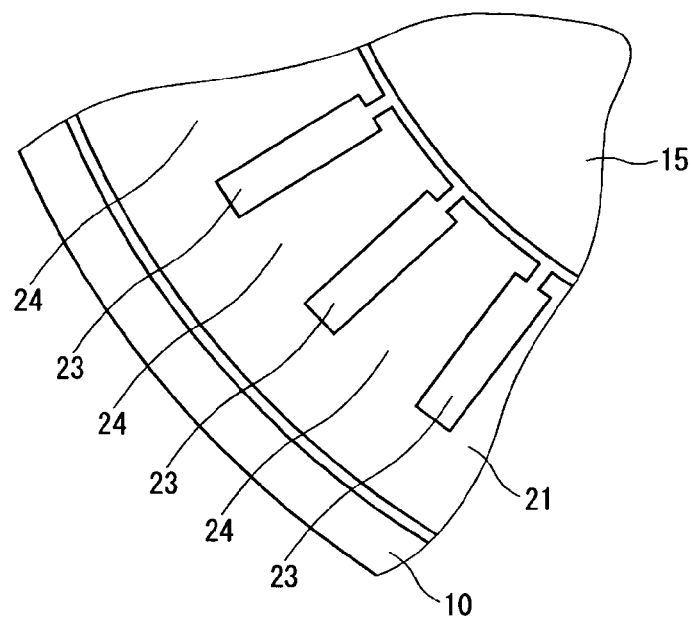
FIG. 1B is a schematic enlarged view of a circled portion, indicated by arrow IB, of the rotary electric machine illustrated in FIG. 1A.
Figure 2:
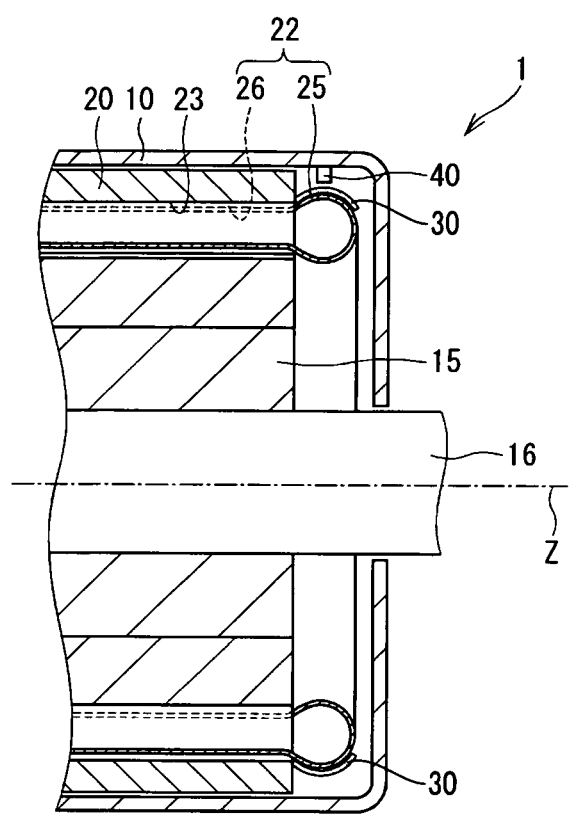
FIG. 2 is a schematic enlarged cross sectional view taken on line II-II in FIG. 1A.

Referring to the drawings, particularly to FIGS. 1A, 1B, and 2, there is illustrated a rotary electric machine 1 according to the first embodiment of the present disclosure.

The rotary electric machine 1 has a substantially cylindrical shape. The rotary electric machine 1 is installed in a vehicle such that the center axis is directed horizontally, in other words, is orthogonal to the height direction of the vehicle while the vehicle is being parked (temporally stopped) or running on a horizontal road. Note that, in the present disclosure, a "horizontal direction" means a direction orthogonal to the direction of the gravitational force corresponding to a "vertical direction (upside and downside)".

The rotary electric machine 1 is comprised of a substantially cylindrical housing 10, a substantially cylindrical stator 20, and a substantially cylindrical rotor 15. The housing 10 has a substantially inner hollow portion. The housing 10 is provided therein with two pairs of oil supplies 40. The one pair of oil supplies 40 is mounted on the inner surface of the top wall of one end of the housing 10, and is provided with an oil supply port 40a directed downward. The other pair of oil supplies 40 is mounted on the inner surface of the top wall of the other end of the housing 10, and is provided with an oil supply port 40a directed downward. The oil supplies 40 of each pair are disposed symmetry with respect to an imaginary plane parallel to the height direction of the vehicle and passing through the center axis of the housing 10. For example, the oil supplies 40 of each pair are penetrated through the top wall of a corresponding end of the housing 10 to communicate with, for example, an oil pump of an oiling system for an internal combustion engine. That is, the oil supplies 40 of each pair are adapted to receive oil fed from the oil pump, and to supply, to the inside of the housing 10, the oil as a coolant.

The stator 20 is installed in the housing 10. Specifically, the stator 20 is comprised of a substantially cylindrical stator core 21 and a stator coil 22 provided in the stator core 21. The stator core 21 is so installed in the housing 10 with its center axis being in agreement with the center axis of the housing 10.

Referring to FIG. 1B, the stator core 21 consists of a substantially cylindrical yoke, and a plurality of teeth 24 projecting radially inward from the inner surface of the yoke. The plurality of teeth 24 are circumferentially arranged at regular pitches therebetween. Spaces surrounded by circumferentially adjacent teeth 24 and the yoke provide a plurality of slots 23 of the stator core 21; the plurality of slots 23 are circumferentially arranged at regular pitches therebetween.

The rotor 15 has a substantially cylindrical rotor core. The rotor 15 is so installed in the stator core 21 with a gap between the rotor 15 and the stator core 21 as to be rotatable about its center axis; this center axis is in agreement with each of the center axes of the housing 10 and the stator 20. Reference character Z will be attached to the common center axis (rotation axis) about which the rotor 15 is rotatable. A rotary shaft 16 is fixedly attached to the inner periphery of the rotor core so that the rotary shaft 16 is rotatable together with the rotor 15. For example, the rotor 15 is comprised of at least one magnet pole pair (at least one pair of north and south magnet poles) mounted on, for example, the outer periphery of the rotor core.

The stator coil 22 consists of the assembly of a plurality of conductor segments.

Each of the plurality of conductor segments consists of a pair of in-slot portions 26 installed in corresponding slots 23 and a U-shaped turn portion continuously extending from first ends of the in-slot portions 26 projecting from the corresponding slots 23. The other ends (second ends) of each of the plurality of conductor segments, opposite to the first ends, project from the corresponding slots 23 in a direction opposite to the projecting direction of the first ends. Each of the second ends of each of the plurality of conductor segments is circumferentially bent outward by a predetermined electric angle with respect to the axial direction of a corresponding slot so that the tip of each of the second ends of each of the plurality of conductor segments is joined to the tip of a corresponding one of the second ends of a corresponding alternative one of the plurality of conductor segments. That is, the joined portions of the stator coil 22 also serve as turn portions of the stator coil 22. This results in that the stator coil 22 is wound in the stator core 21.

As illustrated in FIG. 1A, each of the plurality of conductor segments is arranged such that one in-slot portion 26 is installed in the outermost end of a corresponding slot (first slot) 23 and the other in-slot portion 26 is installed in the innermost end of a corresponding slot (second slot) 23 apart from the first slot 23 in counterclockwise direction in FIG. 1A. That is, each U-shaped turn portion projects from a corresponding slot (first slot) 23, and returns into a corresponding slot (second slot) 23 advancing from the first slot 23 in counterclockwise direction in FIG. 1A. In other words, the U-shaped turn portion of each conductor segment extends from the outermost end of a first slot 23 to the innermost end of a second slot 23 apart from the first slot 23 in counterclockwise direction in FIG. 1A.

The collection of a lot of the U-shaped turn portions of the stator coil 22 axially projecting from the stator core 21 provides a first coil end 25, and the collection of a lot of the joined portions (turn portions) of the stator coil 22 axially projecting from the stator core 21 in a direction opposite to the projecting direction of the U-shaped turn portions provide a second coil end 25.

That is, the first coil end 25 is comprised of the collection of the U-shaper turn portions of the stator coil 22, and the second coil end 25 is comprised of the collection of the joined portions of the stator coil 22. This results in that there are many spaces between adjacent U-shaped turn portions of the stator coil 22 and many spaces between adjacent joined portions thereof. These spaces will be referred to as "conductor spaces S of the stator coil 22" hereinafter.

The oil supplies 40 of each pair are so adjusted in their axial positions as to face a corresponding one of the first and second coil ends 25 (see FIG. 3).

In addition, the rotary electric machine 1 according to the first embodiment is provided with a pair of cylindrical oil guides 30. Each of the oil guides 30 is attached to the stator core 21 with any means, such as screws or adhesive, and placed upon or over the radially outer portion of a corresponding one of the first and second coil ends 25. In other words, a band-like oil guide 30 is configured to cover each of the first and second coil ends 25 from its radially outward. Each of the oil guides 30 is a member adapted to retain and guide oil supplied from a corresponding one pair of the oil supplies 40.

For example, each of the oil guides 30 has a radially outwardly curved shape in its axial cross section with the same curvature as the curvature of the radially outer portion of a corresponding one of the first and second coil ends 25 in its axial cross section, so that, in the first embodiment, each of the oil guides 30 is placed upon the radially outer portion of a corresponding one of the first and second coil ends 25.

If no oil guides 30 were provided in the rotary electric machine 1, oil supplied from an oil supply 40 toward a corresponding coil end 25 could substantially drop downward through the conductor spaces S of the stator coil 22. This would deteriorate the cooling capability of the rotary electric machine 1 for the stator coil 22.

In order to maintain the cooling capability of the rotary electric machine 1 for the stator coil 22 with a high level, the oil guides 30 are provided in the rotary electric machine 1.

Each of the oil guides 30 is formed with a plurality of holes 30h. Each of the oil guides 30 is operative to guide oil supplied from a corresponding pair of oil supplies 40 therealong downward in a circumferential direction of a corresponding coil end 25 based on the supply pressure and the gravity of the oil, and guide a part of the oil radially inward through each hole 30h to a corresponding coil end 25 while absorbing (reducing) the supply pressure and the gravity of the alternative part of the oil. This allows some of the oil, which have passed through the holes 30h, to flow through a pass between each of the oil guides 30 and a corresponding coil end 25. That is, each of the oil guides 30 serves as means for guiding, therethrough and through the holes 30h, oil supplied from oil supply means; this oil supply means is a corresponding pair of oil supplies 40.

FIGS. 3A to 3D illustrate examples of structures of each of the oil guides 30.

Figure 3A:
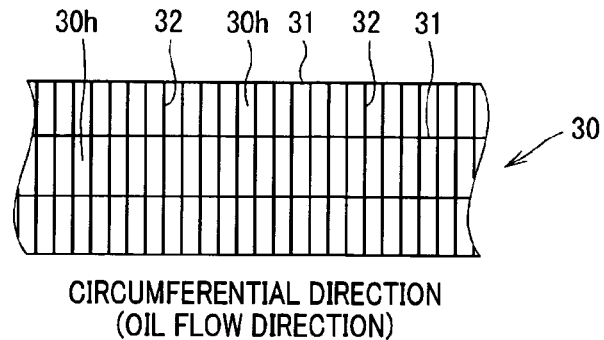
FIG. 3A is a schematic view of one structural example of a part of an oil guide illustrated in FIG. 1A.

Referring to FIG. 3A, each of the oil guides 30 is comprised of a plurality of first threadlike members 31 and a plurality of second threadlike members 32. The first threadlike members 31 extend in a circumferential direction of a corresponding coil end 25 with regular pitches therebetween. The second threadlike members 32 are so mounted on the first threadlike members 31 as to extend, with regular pitches therebetween, in the axial direction (the direction of the center axis Z) of the stator coil 22 orthogonal to the extending direction of the first threadlike members 31. In other words, the first threadlike members 31 and the second threadlike members 32 cross each other at right angles.

This configuration of the first and second threadlike members 31 and 32 provides a plurality of windows surrounded by the first and second threadlike members 31 and 32; these windows configure the holes 30h.

Figure 3B:
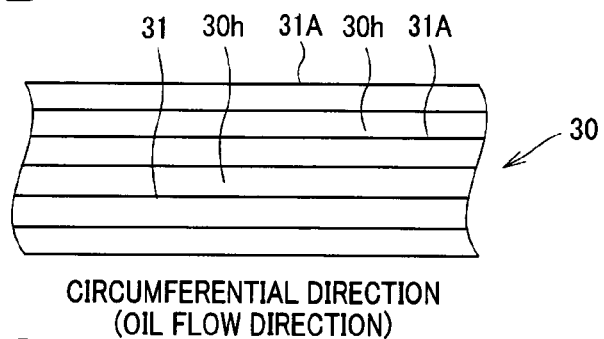
FIG. 3B is a schematic view of another structural example of a part of the oil guide illustrated in FIG. 1A.

Referring to FIG. 3B, each of the oil guides 30 is comprised of a plurality of threadlike members 31A extending in a circumferential direction of a corresponding coil end 25 with regular pitches therebetween. This configuration provides a plurality of slits between the threadlike members 31A; these slits configure the holes 30h.

The interfacial tension between an oil guide 30 and oil is increased with increase in the contact area therebetween. Each of the first threadlike members 31 and the threadlike members 31A can be curved in a circumferential direction of a corresponding coil end 25. The second threadlike members 32 can be curved in the axial direction of the stator coil 22. The first threadlike members 31 and the second threadlike members 32 can cross each other with given angles different from right angles.

Figure 3C:
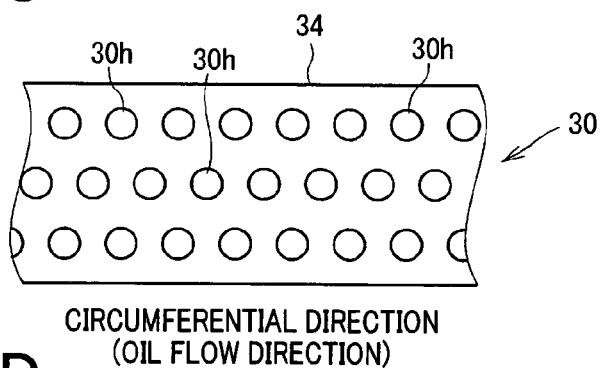
FIG. 3C is a schematic view of a further structural example of a part of the oil guide illustrated in FIG. 1A.

Referring to FIG. 3C, each of the oil guides 30 is comprised of a platy member 34 extending in a circumferential direction of a corresponding coil end 25, and a plurality of circular holes 30h formed through the platy member 34 and arranged in plural rows along the extending direction of the platy member 34.

Figure 3D:
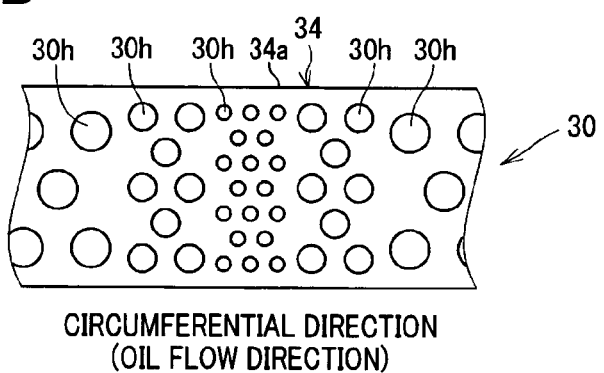
FIG. 3D is a schematic view of a still further structural example of a part of the oil guide illustrated in FIG. 1A.

Referring to FIG. 3D, each of the oil guides 30 is comprised of a platy member (frame) 34 extending in a circumferential direction of a corresponding coil end 25, and a plurality of circular holes 30h therethrough along the extending direction of the platy member 34. The plurality of holes 30h are gradually reduced in size (diameter) from a top portion 34a of the platy member 34 to which oil is supplied from corresponding oil supplies 40 to its bottom portion. In other words, the density of the plurality of holes 30h is gradually reduced from the top portion 34a of the platy member 34 to which oil is supplied from corresponding oil supplies 40 to its bottom portion.

The configuration of the different sized holes 30h allows the resistances of the different sized holes 30h to be reduced with increase in the distances of the different sized holes 30h from the top portion 34a. In other words, the configuration of the different sized holes 30h allows the resistances of the different sized holes 30h to be reduced with decrease in the gravities of parts of oil passing through the different sized holes 30h. Each of the plurality of holes 30h formed through the platy member 34 can be a polygonal hole.

As described above, each of the oil guides 30 is configured to guide oil supplied from a corresponding pair of oil supplies 40 therealong in a circumferential direction of a corresponding coil end 25, and guide some of the oil through the plurality of holes 30h with the resistance of flow passage through each hole 30h being greater than that of flow passage along the guide 30 in a circumferential direction of a corresponding coil end 25. The interfacial tension between the edges of each hole 30h of an oil guide 30 and oil increases the resistance of flow passage through a corresponding hole 30h as compared with the resistance of flow passage along the oil guide 30. That is, each oil guide 30 can have one of various configurations for guiding circumferentially oil therealong and guiding some of the oil to the radially inside thereof while increasing the resistance of the flow passage to the radially inside of the oil guide 30 as compared with the resistance of flow passage along the oil guide 30.

For example, each of the threadlike members 31, 31A, 32 and the platy members 34 can be made of heat resistant resin. Each of the oil guides 30 made of resin is low in rigidity, and therefore, it can be easily formed along a corresponding one of the first and second coil ends 25, and can be easily mounted on a corresponding one of the first and second coil ends 25. In addition, each of the oil guides 30 made of resin allows a corresponding one of the first and second coil ends 25 to be resist damage therefrom. Each of the oil guides 30 can be made from metal or resin-coated metal.

Next, the oil retaining and guiding functions of the oil guide 30 for the first coil end 25 will be described hereinafter with reference to FIGS. 4A to 7B. The oil retaining and guiding functions of the oil guide 30 for the second coil end 25 can be identical to those of the oil guide 30 for the first coil end 25.

Figure 4A:
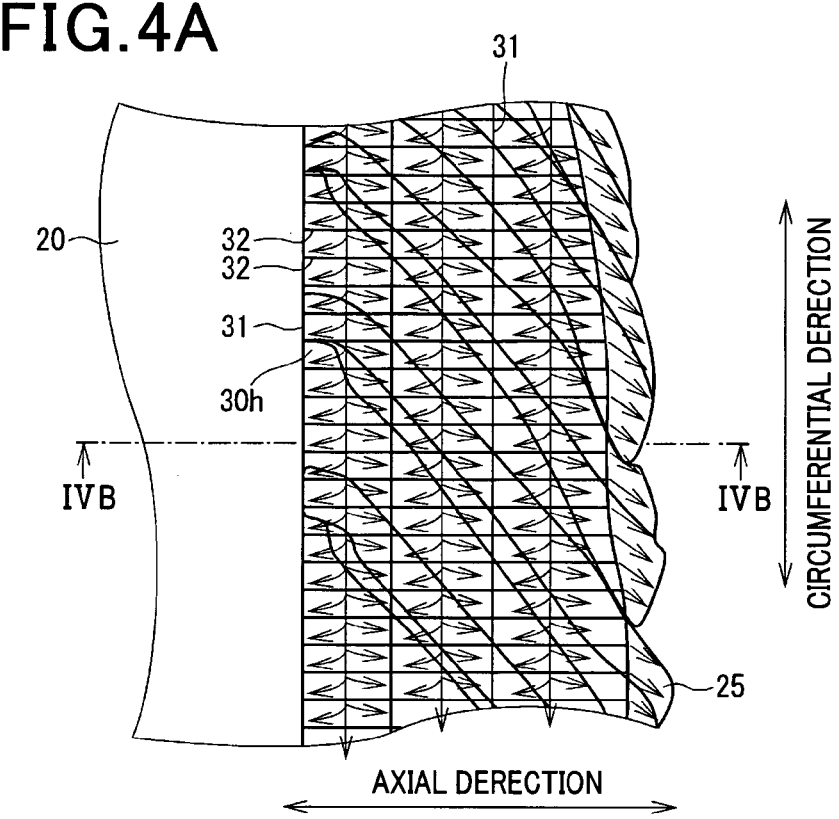
FIG. 4A is a schematic enlarged view on arrow IVA in FIG. 1A of a part of the oil guide with the configuration illustrated in FIG. 3A.
Figure 4B:
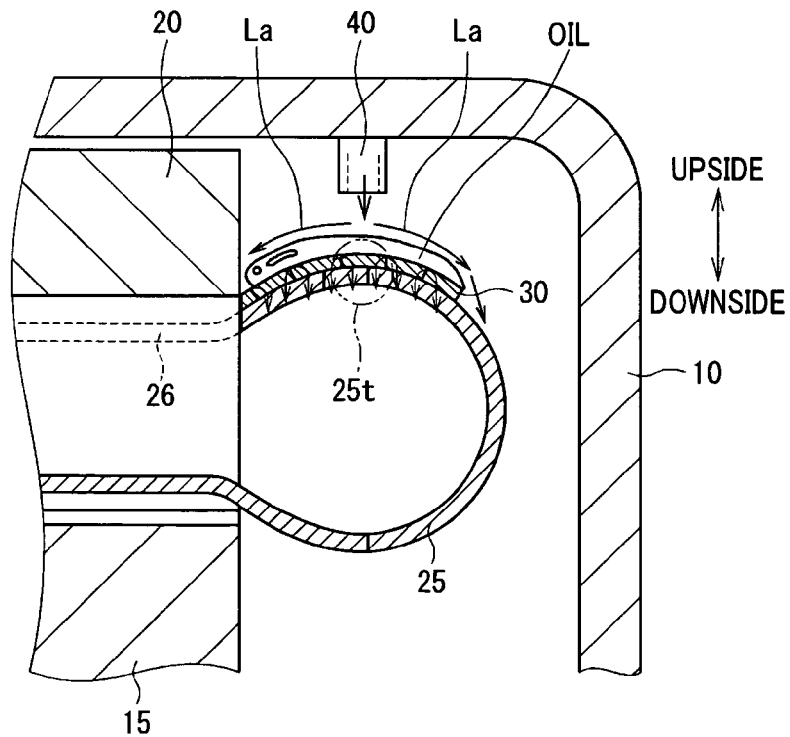
FIG. 4B is a cross sectional view taken on line IVB-IVB in FIG. 4A.

FIG. 4A is a schematic enlarged view on arrow IVA in FIG. 1A of a part of the oil guide 30 for the first coil end 25. In FIG. 4A, flows of oil supplied from a corresponding pair of oil supplies 40 are schematically illustrated by arrows. For example, the oil guide 30 illustrated in FIG. 4A has the configuration illustrated in FIG. 3A. FIG. 4B is a cross sectional view taken on line IVB-IVB in FIG. 4A.

FIG. 4A shows flows of oil supplied from a corresponding pair of oil supplies 40 and guided in a circumferential direction (vertical direction in FIG. 4A) of the oil guide 30 based on the supply pressure and the gravity of the oil, and shows flows of oil in the axial direction of the oil guide 30 (coil end 25) branched off from each circumferential flow of the oil based on the interfacial tension between the branched oil and the second threadlike members 32.

Thus, the oil supplied from a corresponding pair of oil supplies 40 is guided along the outer surface of the oil guide 30 downward in a circumferential direction of the oil guide 30 (the first coil end 25) based on the supply pressure and the gravity of the oil. In addition, a part of the oil is guided radially inward through each hole 30h of the oil guide 30 to the first coil end 25 while the supply pressure and the gravity of the alternative part of the oil is absorbed (see FIG. 4B). This results in that a part of the oil, which has passed through each hole 30h, flows along the inner surface of the oil guide 30 while being in contact with the first coil end 25 by the interfacial tension between the part of the oil and the oil guide 30 and by the interfacial tension between the part of the oil and the first coil end 25.

A radially outermost portion of the first coil end 25 corresponds to an apex 25t of a top portion of the first coil end 25 in its axial cross section (see FIG. 4B). Because the oil guide 30 is placed upon the radially outer portion of the first coil end 25 (see FIG. 4B), the rotary electric machine 1 according to the first embodiment is preferably configured such that each oil supply 40 of a corresponding pair is arranged to supply oil to an apex of a top portion of the oil guide 30 in its axial cross section corresponding to the apex 25t of the top portion of the first coil end 25 in its axial cross section. This configuration allows the oil supplied to the apex of the top portion of the oil guide 30 in its axial cross section to slidably drop along the oil guide 30 in its axial direction, resulting in that the oil directly cools the axial end portion of the first coil end 25 (see arrows La in FIG. 4B). That is, this arrangement of each oil supply 40 of a corresponding pair increases the cooling efficiency of the first coil end 25.

Figure 5A:
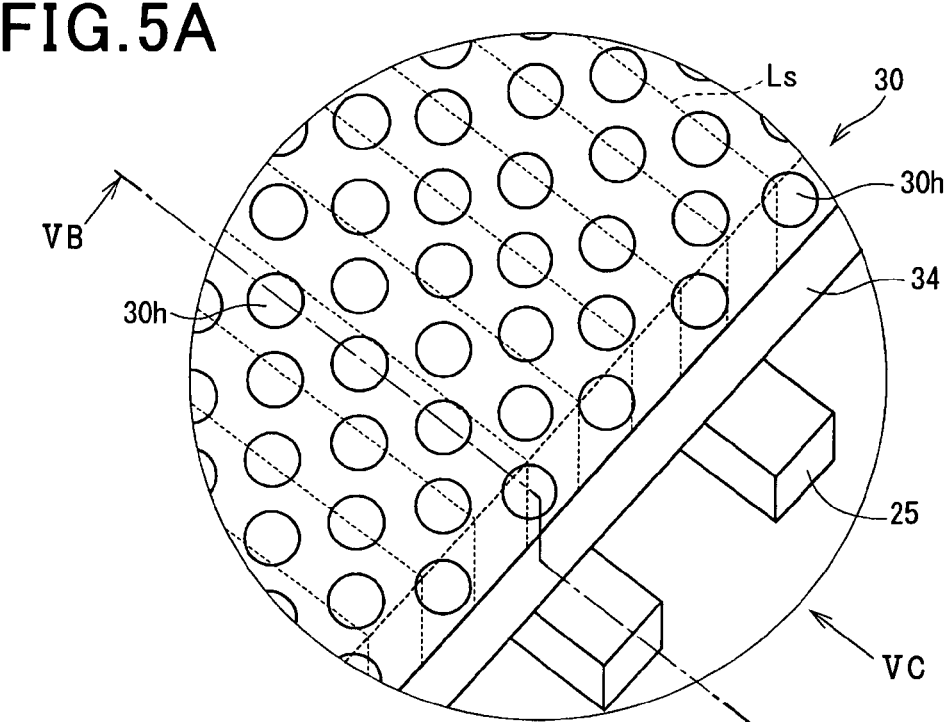
FIG. 5A is a schematic enlarged perspective view of a part of the oil guide with the configuration illustrated in FIG. 3C as viewed from its radially outward.
Figure 5B:
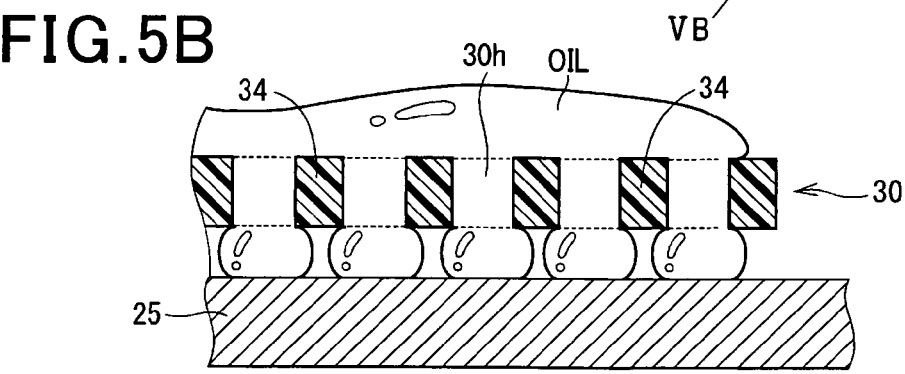
FIG. 5B is a schematic cross sectional view taken on line VB-VB in FIG. 5A.
Figure 5C:
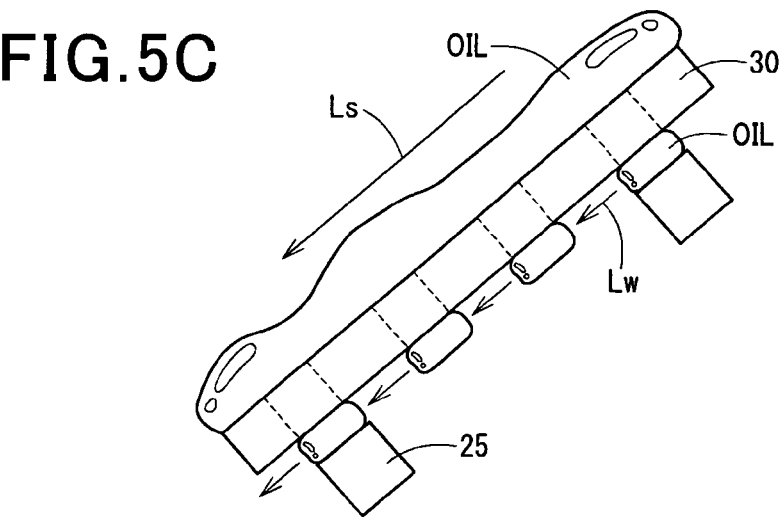
FIG. 5C is a schematic view of the part of the oil guide illustrated in FIG. 5A as viewed from arrow VC.

Next, FIG. 5A is a schematic enlarged perspective view of a part of the oil guide 30 for the first coil end 25 as viewed from its radially outward. The oil guide 30 illustrated in FIG. 5A has the configuration illustrated in FIG. 3C with each circular hole 30h being relatively small in diameter, in other words, with a lot of relatively small circular holes 30h being closely provided. FIG. 5B is a schematic cross sectional view taken on line VB-VB in FIG. 5A, and FIG. 5C is a schematic view of the part of the oil guide 30 illustrated in FIG. 5A as viewed from arrow VC. The number of the holes 30h is greater than that of the turn portions of the first coil end 25.

Referring to FIGS. 5A to 5C, a part of oil supplied from a corresponding pair of oil supplies 40 is guided radially inward through each hole 30h of the oil guide 30 to the first coil end 25 while the supply pressure and the gravity of the part of the oil is absorbed so that the part of the oil, which has passed through each hole 30h, grows at the bottom of a corresponding hole 30h by the interfacial tension between the part of the oil and each hole 30h (see FIGS. 5B and 5C).

If a turn portion of the first coil end 25c is positioned to be opposite to the part of the oil blowing up at the bottom of a hole 30h, the part of the oil blowing up at the bottom of the hole 30h is retained on the first coil end 25 by the interfacial tension between the part of the oil and each hole 30h and by the interfacial tension between the part of the oil and the first coil end 25. That is, the part of the oil is in contact with the first coil end 25.

Thereafter, the part of the oil flows along the inner surface of the oil guide 30 by the interfacial tension between the part of the oil and the inner surface of the oil guide 30 (see arrows Lw in FIG. 5C), or falls downward based on the supply pressure and the gravity of the part of the oil.

Otherwise, if a turn portion of the first coil end 25c is not positioned to be opposite to the part of the oil blowing up at the bottom of a hole 30h, the part of the oil blowing up at the bottom of the hole 30h flows along the inner surface of the oil guide 30 by the interfacial tension between the part of the oil and the inner surface of the oil guide 30 (see arrows Lw in FIG. 5C), or falls downward based on the supply pressure and the gravity of the part of the oil. The part of the oil flowing along the inner surface of the oil guide 30 or falling downward travels through the first coil end 25 up to the bottom of the first coil end 25, thus cooling the first coil end 25.

Note that adjustment of the viscosity of oil and/or the oil guide 30 can adjust the interfacial tension between the oil and the oil guide 30, and adjust the relationship between the interfacial tension and the sum of the supply pressure and the gravity of the oil. Adjustment of the viscosity of oil and/or the first coil end 25 can adjust the interfacial tension between the oil and the first coil end 25, and adjust the relationship between the interfacial tension and the sum of the supply pressure and the gravity of the oil.

In addition, an alternative part of the oil supplied from a corresponding pair of oil supplies 40 is guided along the outer surface of the oil guide 30 in a circumferential direction of the oil guide 30 (the first coil end 25) based on the supply pressure and the gravity of the alternative art of the oil (see arrow Ls in FIG. 5C).

Figure 6A:
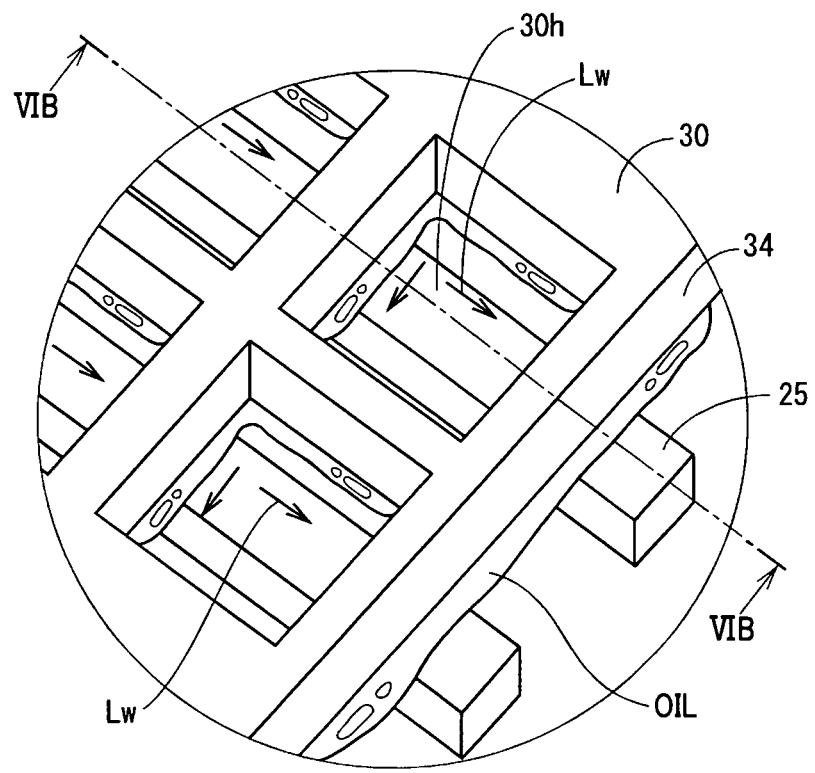
FIG. 6A is a schematic enlarged perspective view of a part of the oil guide with the configuration illustrated in FIG. 3C as viewed from its radially outward.
Figure 6B:
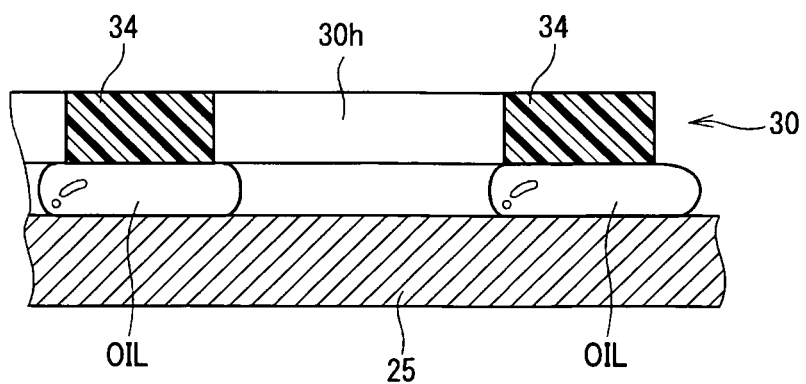
FIG. 6B is a schematic cross sectional view taken on line VIB-VIB in FIG. 6A.

Next, FIG. 6A is a schematic enlarged perspective view of a part of the oil guide 30 for the first coil end 25 as viewed from its radially outward. The oil guide 30 illustrated in FIG. 6A has the configuration illustrated in FIG. 3C with each rectangular hole 30h being relatively large in size, in other words, with a lot of relatively large holes 30h being roughly provided. FIG. 6B is a schematic cross sectional view taken on line VIB-VIB in FIG. 6A.

Referring to FIGS. 6A and 6B, a part of oil supplied from a corresponding pair of oil supplies 40 is guided radially inward to pass through each rectangular hole 30h of the oil guide 30 to the first coil end 25.

Alternative parts of the oil are stayed on the edges (peripheries) of the rectangular holes 30h by the interfacial tension between the alternative part of the oil and the edges of the rectangular holes 30h (see FIG. 6B).

If a turn portion of the first coil end 25c is positioned to be opposite to an alternative part of the oil stayed on one edge of adjacent rectangular holes 30h, the alternative part of the oil is retained on the first coil end 25 by the interfacial tension between the part of the oil and the one edge and by the interfacial tension between the alternative part of the oil and the first coil end 25. That is, the alternative part of the oil is in contact with the first coil end 25. Thereafter, the alternative part of the oil flows along the inner surface of the oil guide 30 by the interfacial tension between the alternative part of the oil and the inner surface of the oil guide 30 (see arrows Lw in FIG. 6A), or falls downward based on the supply pressure and the gravity of the alternative part of the oil.

Otherwise, if a turn portion of the first coil end 25c is not positioned to be opposite to an alternative part of the oil stayed on one edge of adjacent rectangular holes 30h, the alternative part of the oil flows along the inner surface of the oil guide 30 by the interfacial tension between the alternative part of the oil and the inner surface of the oil guide 30 (see arrows Lw in FIG. 6A), or falls downward based on the supply pressure and the gravity of the alternative part of the oil. The alternative part of the oil flowing along the inner surface of the oil guide 30 or falling downward travels through the first coil end 25 up to the bottom of the first coil end 25, thus cooling the first coil end 25.

In addition, a further part of the oil supplied from a corresponding pair of oil supplies 40 is guided along the outer surface of the oil guide 30 in a circumferential direction of the oil guide 30 (the first coil end 25) based on the supply pressure and the gravity of the alternative art of the oil.

Note that each inner corner angle of at least one rectangular hole 30h illustrated in FIG. 6A is right angles, but can be rounded. In other words, each of the plurality of holes 30h formed through the platy member 34 can be a rounded polygonal hole.

Figure 7A:
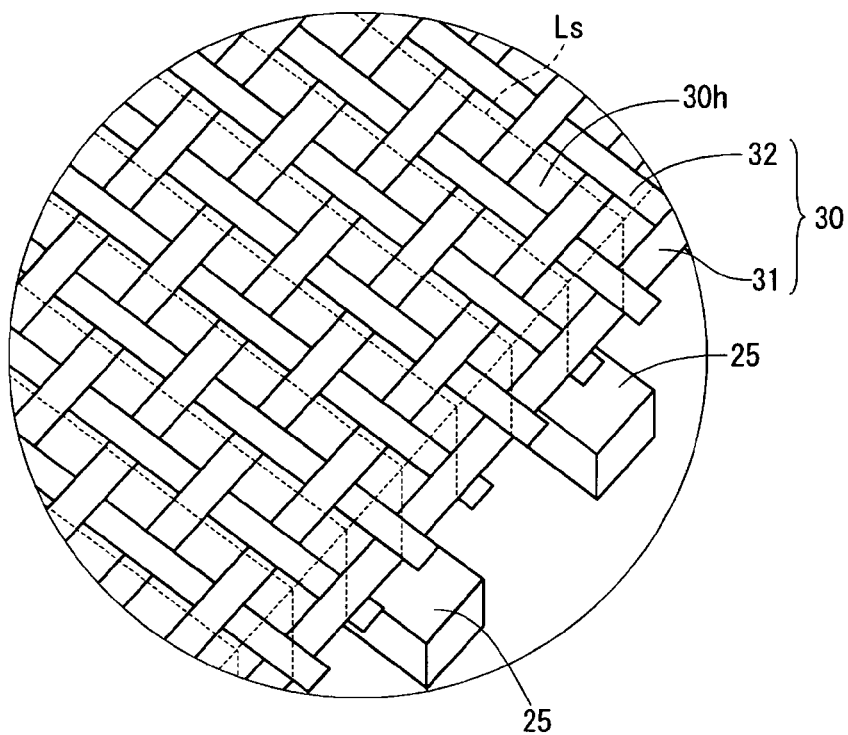
FIG. 7A is a schematic enlarged perspective view of a part of the oil guide, which has the configuration illustrated in FIG. 3A with each rectangular hole being relatively small in size, as viewed from its radially outward.
Figure 7B:
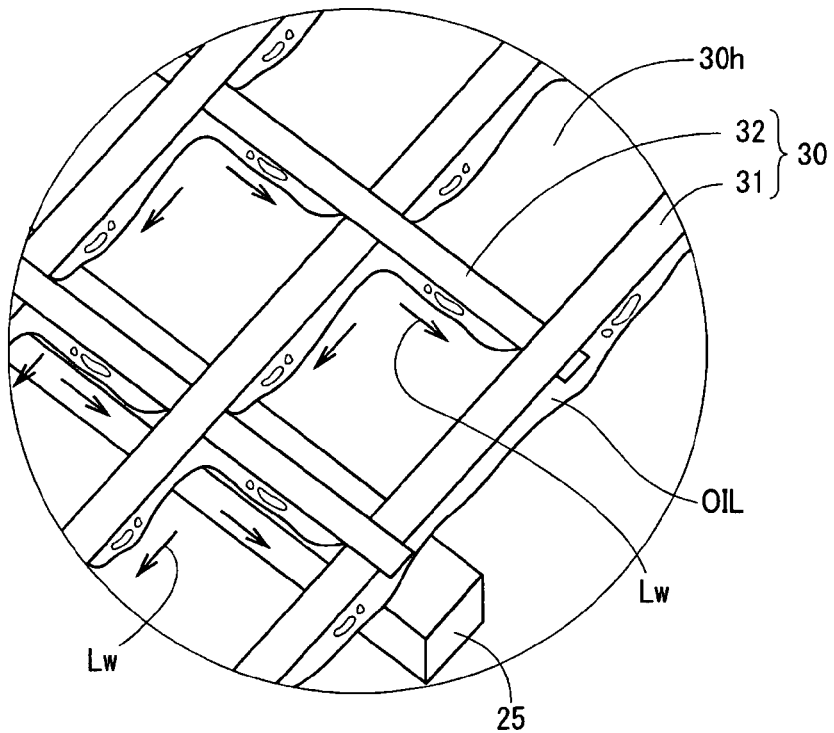
FIG. 7B is a schematic enlarged perspective view of a part of the oil guide, which has the configuration illustrated in FIG. 3A with each rectangular hole being relatively large in size, as viewed from its radially outward.

FIG. 7A is a schematic enlarged perspective view of a part of the oil guide 30 for the first coil end 25 as viewed from its radially outward. The oil guide 30 illustrated in FIG. 7A has the configuration illustrated in FIG. 3A with each rectangular hole 30h being relatively small in size, in other words, with a lot of relatively small holes 30h being closely provided. FIG. 7B is an enlarged perspective view of a part of the oil guide 30 for the first coil end 25 as viewed from its radially outward. The oil guide 30 illustrated in FIG. 7B has the configuration illustrated in FIG. 3A with each rectangular hole 30h being relatively large in size, in other words, with a lot of relatively large holes 30h being roughly provided.

The oil retaining and guiding functions of the oil guide 30 illustrated in FIG. 7A are substantially identical to those of the oil guide 30 illustrated in FIGS. 5A to 5C, and the oil retaining and guiding functions of the oil guide 30 illustrated in FIG. 7B are substantially identical to those of the oil guide 30 illustrated in FIGS. 6A and 6B.

Note that the holes 30h are regarded as relatively small holes or relatively large holes, in other words, as closely provided or roughly provided for convenience, and therefore they cannot be definitely regarded as relatively small holes or relatively large holes, in other words, as closely provided or roughly provided. That is, some of the holes 30h can be regarded as relatively small holes and the remainder can be regarded as relatively large holes so that actual oil retaining and guiding functions of the oil guide 30 are constructed as the combination of the oil retaining and guiding functions for relatively small holes and those for relatively large holes.

Figure 8A:
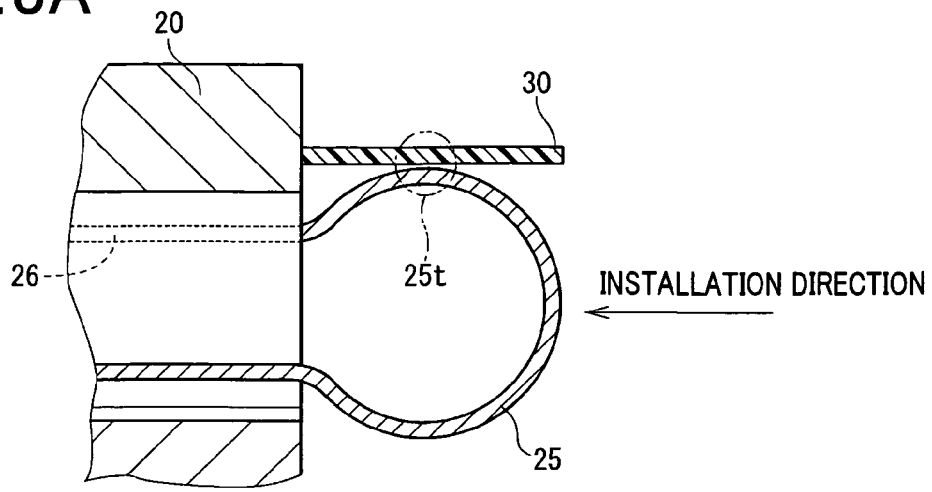
FIG. 8A is a schematic enlarged cross sectional view of a first modified structure of the oil guide and a first coil end corresponding to the cross sectional view of FIG. 4B except for a housing illustrated in FIG. 4B.
Figure 8B:
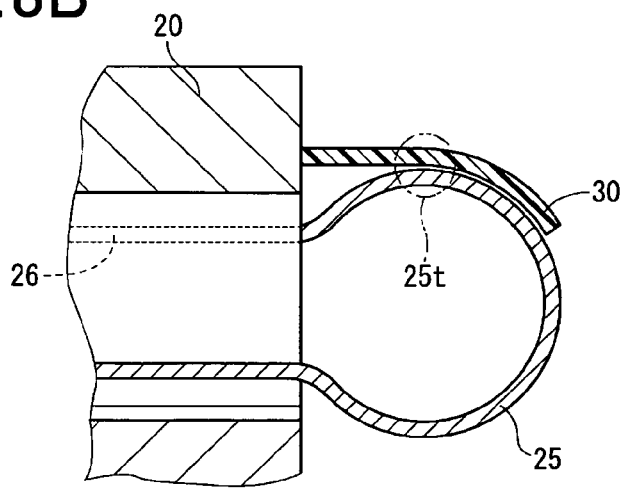
FIG. 8B is a schematic enlarged cross sectional view of a second modified structure of the oil guide and the first coil end corresponding to the cross sectional view of FIG. 4B except for the housing illustrated in FIG. 4B.
Figure 8C:
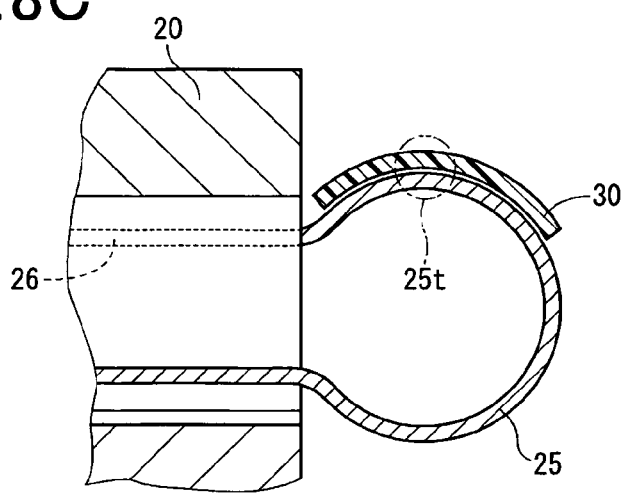
FIG. 8C is a schematic enlarged cross sectional view of the oil guide and the first coil end corresponding to the cross sectional view of FIG. 4B except for the housing illustrated in FIG. 4B.

As illustrated in FIG. 4B, the oil guide 30 for the first coil end 25 has a radially outwardly curved shape in its axial cross section with the same curvature as the curvature of the radially outer portion of the first coil end 25 in its axial cross section, so that the oil guide 30 is placed upon the radially outer portion of the first coil end 25 (see FIG. 8C). However, the configuration of each of the oil guides 30 in its axial cross section can be modified.

Referring to FIG. 8A, the oil guide 30 for the first coil end 25 can have a linear shape in its axial cross section in substantially parallel to the axial direction of the stator coil 22. The oil guide 30 is in contact onto the apex 25t or thereround of the first coil end 25 via oil. This configuration of the oil guide 30 facilitates the forming of a material into the shape of the oil guide 30 illustrated in FIG. 8A, and the arrangement of the oil guide 30 around a corresponding coil end 25.

Referring to FIG. 8B, a part of the oil guide 30 for the first coil end 25 has a radially outwardly curved shape in its axial cross section with the same curvature as the curvature of a corresponding part of the radially outer portion of the first coil end 25 in its axial cross section, so that at least the part of the oil guide 30 is placed upon the corresponding part of the radially outer portion of the first coil end 25, so that the at least part of the oil guide 30 is in contact onto the corresponding part of the radially outer portion of the first coil end 25 via oil (see FIG. 8B). This configuration of the oil guide 30 increases the contact area between the oil guide 30 and the first coil end 25 via oil as compared to the configuration of the oil guide 30 illustrated in FIG. 8A.

In the first embodiment, the whole of the oil guide 30 is placed upon the radially outer portion of the first coil end 25, so that the whole of the oil guide 30 is in contact onto the radially outer portion of the first coil end 25 via oil (see FIG. 8C). This configuration of the oil guide 30 more increases the contact area between the oil guide 30 and the first coil end 25 via oil as compared with the configuration of the oil guide 30 illustrated in FIG. 8B.

As described above, the rotary electric machine 1 according to the first embodiment is provided with the pair of oil guides 30 each covering a corresponding one of the first and second coil ends 25 from its radially outward. Each of the oil guides 30 is configured to guide oil supplied from a corresponding pair of oil supplies 40 therealong downward in a circumferential direction of a corresponding coil end 25 based on the supply pressure and the gravity of the oil, and guide a part of the supplied oil radially inward through each hole 30h to a corresponding coil end 25 while absorbing (reducing) the supply pressure and the gravity of the part of the oil. This allows oil, which has passed through each hole 30h, to flow through a pass between each of the oil guides 30 and a corresponding coil end 25 by the interfacial tension between the oil and the oil guide 30 and by the interfacial tension between the oil and the corresponding coil end 25. This makes the oil sufficiently and continuously contact with each of the coil ends 25, thus maintaining the cooling capability of the rotary electric machine 1 for the stator coil 22 at a high level.

Particularly, even if the stator coil 22 of the rotary electric machine 1 consists of the assembly of a plurality of conductor segments with many conductor spaces between adjacent U-shaped turn portions and those between adjacent joined portions, it is possible to continuously interpose a part of supplied oil between each of the oil guides 30 and a corresponding coil end 25 while reducing alternative parts of the supplied oil from dropping the conductor spaces. Thus, it is possible to provide a lot of rotary electric machines 1, each of which includes the stator coil 22 consisting of the assembly of a plurality of conductor segments, with an improved cooling capability for the stator coil 22.

In addition, the configuration of the rotary electric machine 1 easily guides oil in a circumferential direction of each of the coil ends 25 while a part of the oil is in contact with each of the coil ends 25. Thus, it is possible to maintain, at a high level, the cooling capability of the rotary electric machine 1 for each coil end 25 throughout its circumferential direction.

Second Embodiment

Figure 9A:
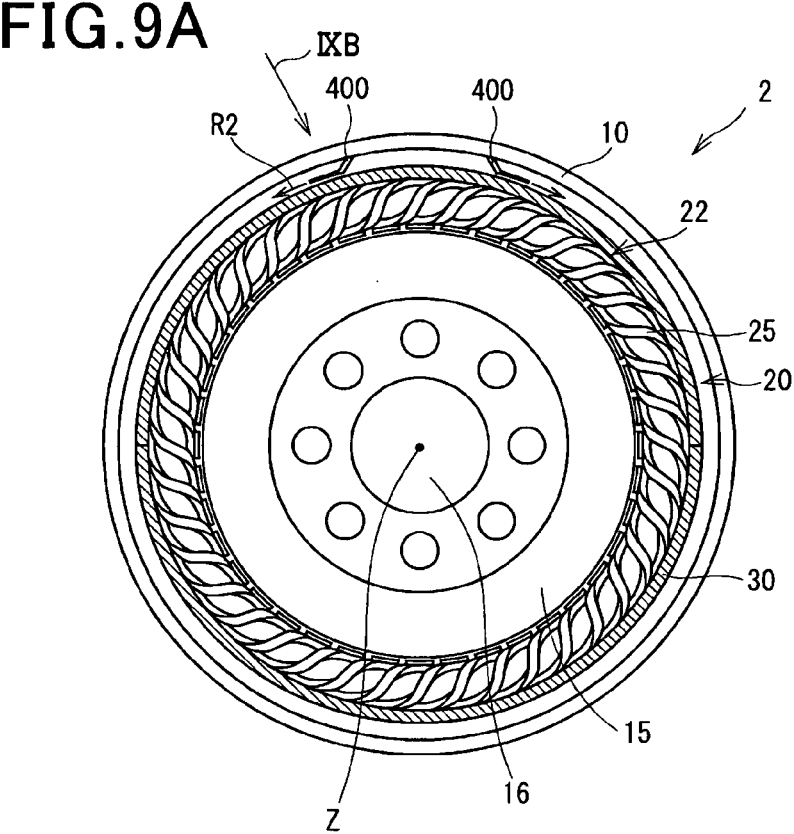
FIG. 9A is a schematic axial end view of a rotary electric machine according to the second embodiment of the present disclosure.
Figure 9B:
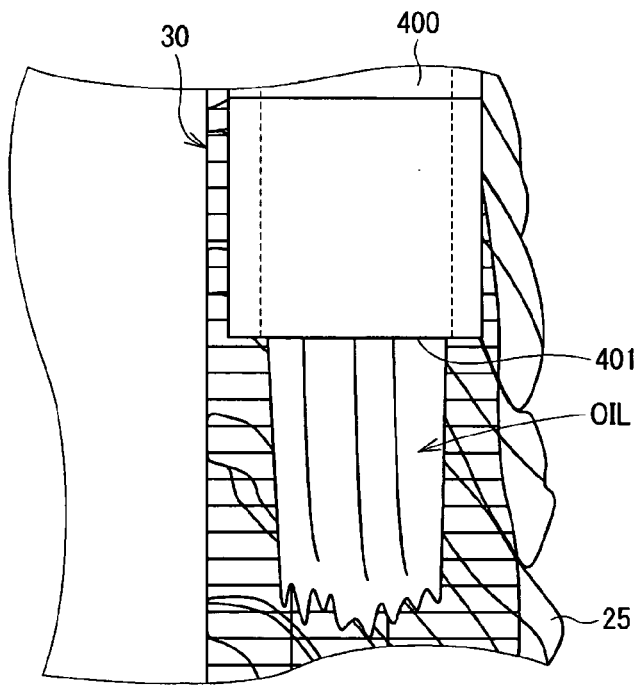
FIG. 9B is a schematic enlarged view of a part of the rotary electric machine illustrated in FIG. 9A indicated by arrow IXB in FIG. 9A while a housing is omitted in illustration.

A rotary electric machine 2 according to the second embodiment of the present disclosure will be described hereinafter with reference to FIGS. 9A and 9B.

The structure and/or functions of the rotary electric machine 2 according to the second embodiment are different from those of the rotary electric machine 1 according to the first embodiment by the following points. So, the different points will be mainly described hereinafter. FIG. 9A is a schematic axial end view of the rotary electric machine 2 according to the second embodiment of the present disclosure. FIG. 9B is a schematic enlarged view of a part of the rotary electric machine 2 as viewed from arrow IXB in FIG. 9A.

The rotary electric machine 2 is comprised of two pairs of oil supplies 400 in place of the two pairs of oil supplies 40. As illustrated in FIGS. 9A and 9B, one pair of oil supply 400 is provided with an oil supply port 401. The oil supply port 401 is mounted radially over a corresponding radially outer portion of a corresponding oil guide 30 and directed outward in a tangential direction of the corresponding radially outer portion of the oil guide 30. In other words, the oil supply port 401 of the one pair of the oil supply 400 is directed outward in a circumferential direction of the oil guide 30. The oil supply port 401 of the one pair of the oil supply 400 is wider in the axial direction of the oil guide 30 than the supply port 40$a$ of the corresponding one pair of the oil supplies 40 (see FIGS. 9B and 4B). In other others, the oil supply port 401 of the one pair of the oil supply 400 has a relatively wide width in the axial direction of the oil guide 30 as compared with a radial width of the oil supply port 401.

This configuration of the rotary electric machine 2 allows oil supplied from each oil supply 400 to be guided in a relatively wide range on a corresponding oil guide 30 in its axial direction with the thickness of the oil on the oil guide 30 being relatively small. This reduces the weight of the oil supplied on the oil guide 30 per unit area of the oil guide 30, thus facilitating the oil to flow along the oil guide 30 in a circumferential direction of a corresponding coil end 25. In addition, the configuration of the rotary electric machine 2 supplies oil in the oil guiding direction of the oil guide 30 (see arrow R2 in FIG. 9A).

This configuration therefore makes it possible to maintain, at a further high level, the cooling capability of the rotary electric machine 2 for each coil end 25 throughout its circumferential direction.

Third Embodiment

A rotary electric machine 3 according to the third embodiment of the present disclosure will be described hereinafter with reference to FIGS. 10A to 11B.

The structure and/or functions of the rotary electric machine 3 according to the third embodiment are different from those of the rotary electric machine 1 according to the first embodiment by the following points. So, the different points will be mainly described hereinafter.

Figure 10A:
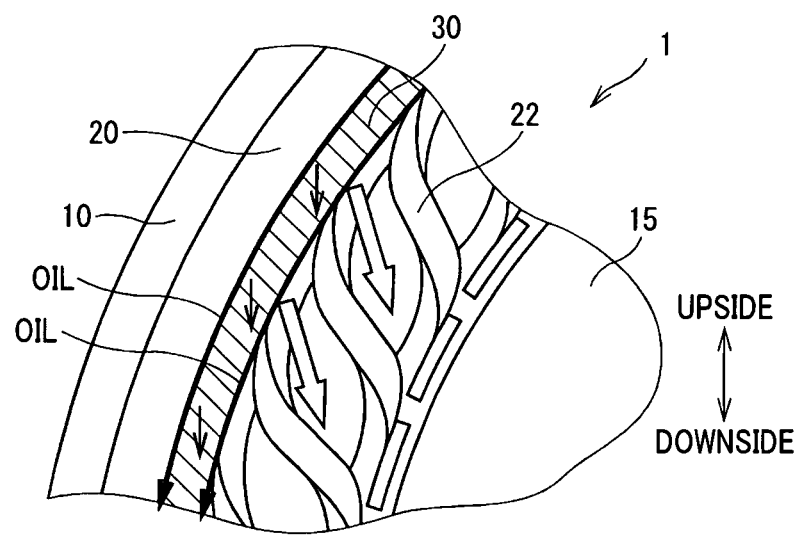
FIG. 10A is a partially schematic enlarged view of a portion of the top half of the rotary electric machine illustrated in FIG. 1A indicated by arrow XA.
Figure 10B:
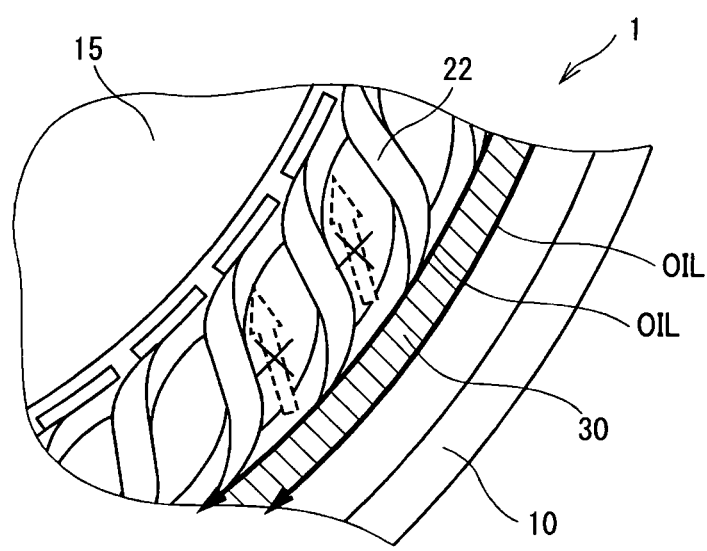
FIG. 10B is a partially schematic enlarged view of a portion of the bottom half of the rotary electric machine illustrated in FIG. 1A indicated by arrow XB.

FIGS. 10A and 10B are partially schematic enlarged views of respective top and bottom halves of the first coil end 25 of the rotary electric machine 1 in order to compare with the rotary electric machine 3 according to the third embodiment.

As described above, the rotary electric machine 1 is installed in the vehicle such that the center axis is orthogonal to the height direction of the vehicle. The rotary electric machine 1 is configured such that oil supplied from an oil supply 40 to the top half of the oil guide 30 placed on the top half of the first coil end 25 falls, by the gravity of the oil, along the top half of the oil guide 30 while passing through the holes 30$h$ up to the bottom of the oil guide 30. This configuration aims to cool the first coil end 25 of the stator coil 22.

FIG. 10A schematically illustrates how oil flows in the top half of the first coil end 25 of the rotary electric machine 1. Referring to FIG. 10A, after passing through the holes 30$h$ of the top half of the oil guide 30 for the first coil end 25, parts of oil fall by their gravities through the inside of the first coil end 25. This allows the parts of oil falling through the inside of the first coil end 25 to wet the turn portions of the first coil end 25.

Particularly, in the top left half of the first coil end 25 of the rotary electric machine 1 in FIG. 10A, because the turn portions of the first coil end 25 extend substantially vertically, some of oil, which have passed through the holes 30$h$ of the top left half of the oil guide 30, flow along the turn portions of the first coil end 25. This more efficiently cools the first coil end 25.

In contrast, FIG. 10B schematically illustrates how oil flows in the bottom half of the first coil end 25 of the rotary electric machine 1. Referring to FIG. 10B, parts of oil guided along the outer and inner surfaces of the oil guide 30 for the first coil end 25 do not rise against their gravities in the bottom half of the oil guide 30. For this reason, the turn portions of the bottom part of the first coil end 25 may not be sufficiently wetted; this problem can be similarly found in the bottom half of the second coil end 25.

The rotary electric machine 3 according to the third embodiment is therefore designed to sufficiently wet the turn portions of the bottom half of each of the first and second coil ends 25.

Figure 11A:
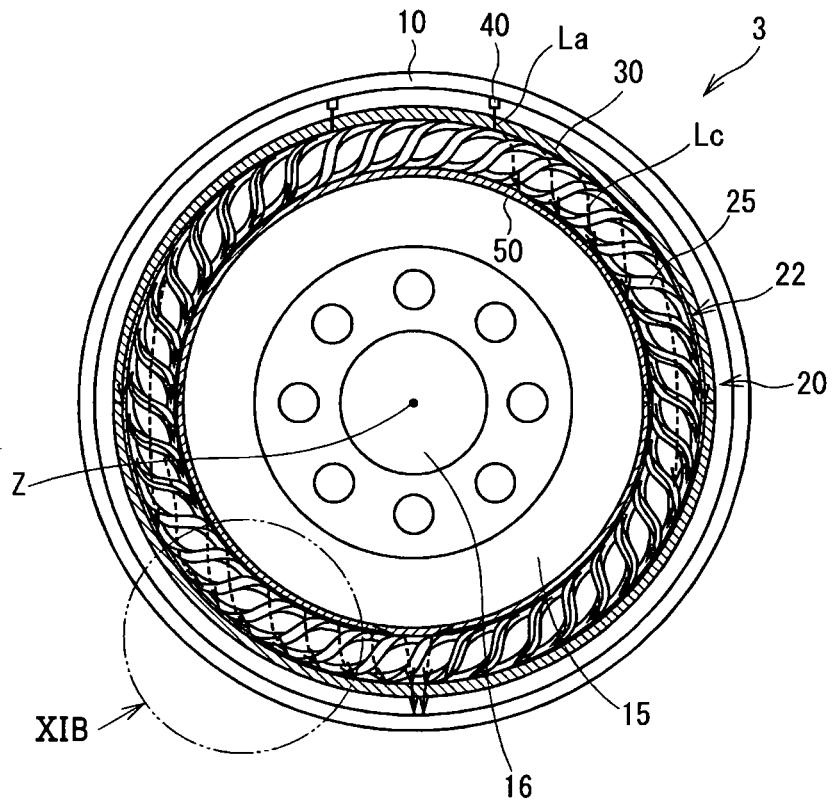
FIG. 11A is a schematic enlarged view of the first coil end of a rotary electric machine according to the third embodiment of the present disclosure.
Figure 11B:
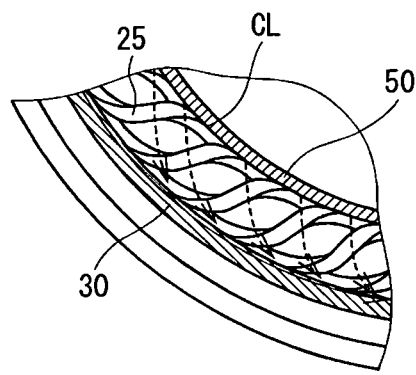
FIG. 11B is a partially schematic enlarged view of a part of the bottom half of the first coil end of the rotary electric machine as viewed from arrow XIB in FIG. 11A.

FIG. 11A is a schematic enlarged view of the first coil end 25 of the rotary electric machine 3 according to the third embodiment. FIG. 11B is a partially schematic enlarged view of a part of the bottom half of the first coil end of the rotary electric machine 3 as viewed from arrow XIB in FIG. 11A.

The rotary electric machine 3 is comprised of the housing 10, the rotor 15, and the stator 20 consisting of the stator core 21 and the stator coil 22; this configuration is identical to the configuration of the rotary electric machine 1 according to the first embodiment. As well as the rotary electric machine 1, the rotary electric machine 3 is comprised of the pair of oil guides 30 each covering a corresponding one of the first and second coil ends 25 from its radially outward. For example, the oil guide 30 for each of the first and second coil ends 25 according to the third embodiment has a mesh configuration as an example of which is illustrated in FIG. 3A.

In addition, the rotary electric machine 3 is provided with a pair of cylindrical oil recovery sheets 50 each made of, for example, heat resistant resin. Each of the oil recovery sheets 50 is placed over the inner periphery of a corresponding one of the first and second coil ends 25 with a clearance CL therebetween. In other words, a band-like oil recovery sheet 50 is configured to cover each of the first and second coil ends 25 from its radially inward. Each of the oil recovery sheets 50 is a member adapted to block oil from passing therethrough and recover it thereon. For example, the clearance CL is determined to have capillary action that causes oil to flow therethrough.

Thus, after passing through the oil guide 30, oil falls by its gravity through the inside of the top half of the first coil end 25 (see dashed arrows Lc in FIG. 11A), so that parts of the oil enter in the clearance CL. That is, parts of the oil falling from the oil guide 30 through the inside of the upper half part of the first coil end 25 are recovered by the oil recovery sheet 50.

Thereafter, the parts of the oil recovered in the clearance CL flow along the outer surface of the oil recovery sheet 50 while being in contact with the inner periphery of the first coil end 25 up to the bottom of the first coil end 25. This efficiently cools the bottom half of the first coil end 25 in addition to the top half thereof.

While the oil is guided to flow along the outer surface of the oil recovery sheet 50 in the bottom half of the first coil end 25, parts of the oil fall by their gravities through the bottom half of the first coil end 25 (see dashed arrows in FIG. 11B). This more efficiently cools the bottom half of the first coil end 25.

The oil recovering and guiding functions of the oil recovery sheet 50 for the second coil end 25 can be identical to those of the oil recovery sheet 50 for the first coil end 25.

As described above, the configuration of the rotary electric machine 3 according to the third embodiment makes it possible to improve the cooling capability of the rotary electric machine 3 for each of the first and second coil ends 25 throughout its circumferential direction.

Fourth Embodiment

A rotary electric machine 4 according to the fourth embodiment of the present disclosure will be described hereinafter with reference to FIGS. 12 and 13.

The structure and/or functions of the rotary electric machine 4 according to the fourth embodiment are different from those of the rotary electric machine 3 according to the third embodiment by the following points. So, the different points will be mainly described hereinafter.

Figure 12:
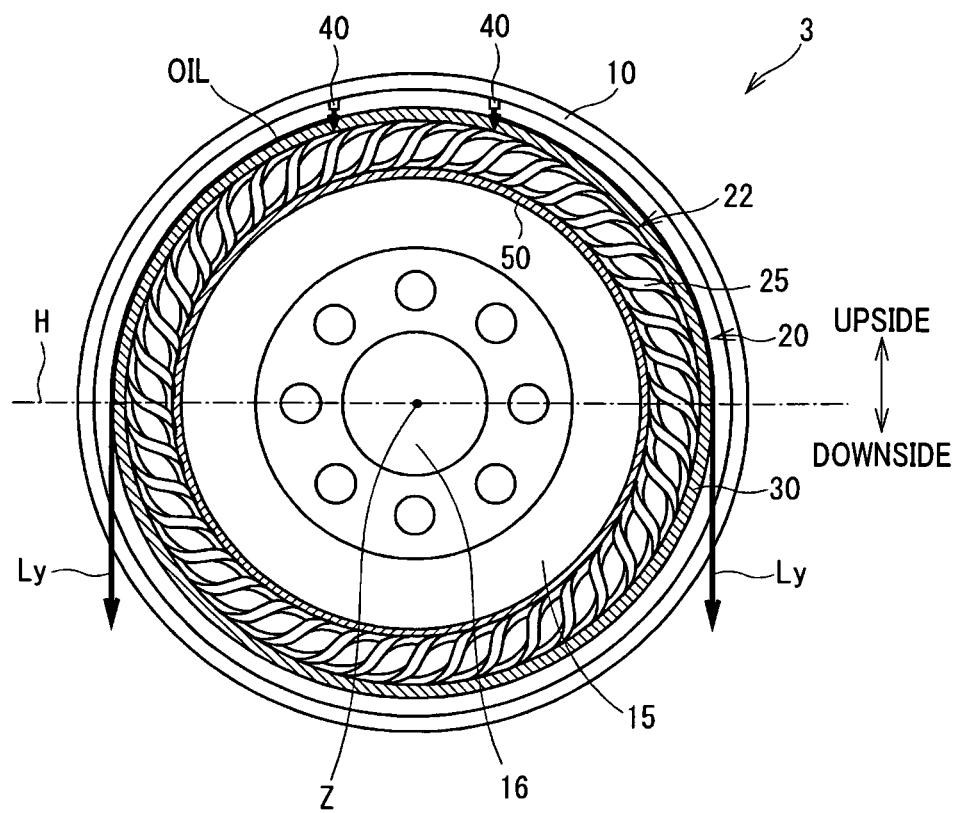
FIG. 12 is a schematic axial end view of the rotary electric machine according to the third embodiment of the present disclosure.

FIG. 12 is a schematic axial end view of the rotary electric machine 3 according to the third embodiment of the present disclosure. As described above, the rotary electric machine 3 according to the third embodiment is provided with the pair of oil recovery sheets 50 each placed over the radially inner portion of a corresponding one of the first and second coil ends 25 with the clearance CL therebetween. The oil recovery sheet 50 for the first coil end 25 is adapted to recover parts of oil, which have passed through the oil guide 30, and to cool the first coil end 25 with the recovered oil, thus improving the cooling capability of the rotary electric machine 3 for the stator coil 22.

If the flow rate of oil supplied from each oil supply 40 above the first coil end 25 were relatively high, the velocity of the oil falling along the corresponding oil guide 30 would become high. In the fourth embodiment, it is assumed that a horizontal plane passing through the center axis Z is referred to as a "horizontal reference plane H"; this horizontal reference plane H separates the top half and the bottom half of the oil guide. In this assumption, the amount of a part Ly of the supplied oil from each oil supply 40 dropping downward from a corresponding radially outermost end of the oil guide 30 on the horizontal reference plane H would be increased. This would result in a decrease of the amount of a part La of the supplied oil from each oil supply 40 passing through the oil guide 30 (see FIG. 11A). Thus, in the top half of the first coil end 25, it may be difficult to recover a sufficient amount of oil on the oil recovery sheet 50. This may reduce an amount of oil to be supplied in the bottom half of the first coil end 25.

The rotary electric machine 4 according to the fourth embodiment is therefore designed to increase an amount of oil to be supplied in the bottom half of the first coil end 25.

Figure 13:
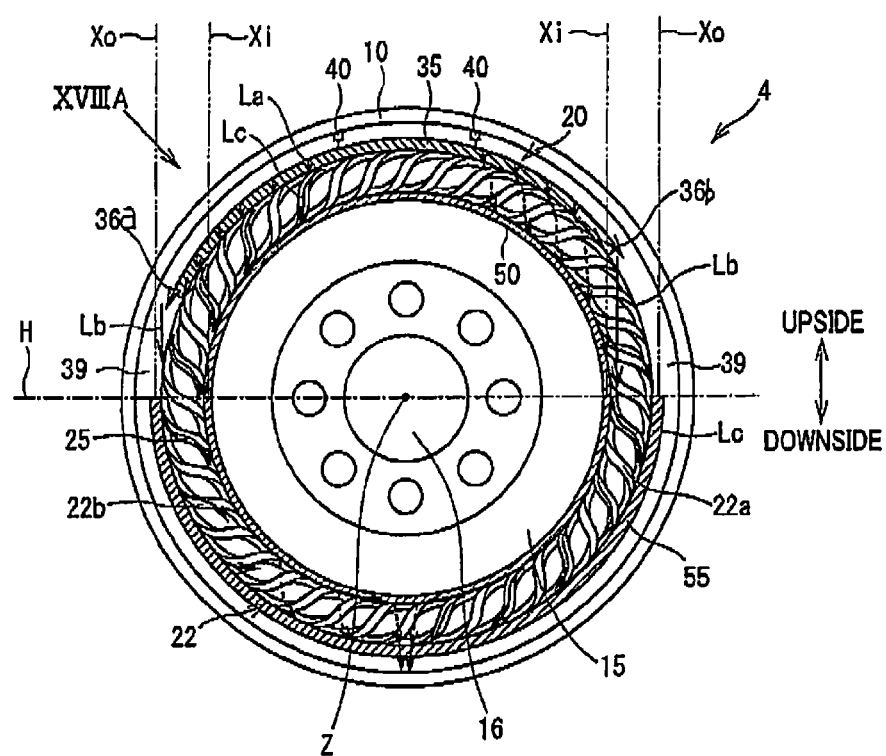
FIG. 13 is a schematic axial end view of a rotary electric machine according to the fourth embodiment of the present disclosure.

FIG. 13 is a schematic axial end view of the rotary electric machine 4 according to the fourth embodiment of the present disclosure.

The rotary electric machine 4 is comprised of the housing 10, the rotor 15, and the stator 20 consisting of the stator core 21 and the stator coil 22; this configuration is identical to the configuration of the rotary electric machine 3 according to the third embodiment.

The rotary electric machine 4 is comprised of a pair of oil guides 35 each attached to the stator core 21 and placed on or over a top portion of the top half of a corresponding one of the first and second coil ends 25 with both first and second spaces 39 between the circumferential edges 36a and 36b of the oil guide 35 and the horizontal reference plane H. The oil guide 35 has an outwardly curved shape in its lateral cross section along the circumferential direction of a top portion of a corresponding coil end 25 with the same curvature as the curvature of the coil end 25 in its circumferential cross section. The oil guide 35 also has, for example, an outwardly curved shape in a cross section parallel to the height direction of the vehicle and passing through the center axis Z. The curvature of the oil guide 35 is the same as the curvature of a corresponding top portion of a corresponding one of the first and second coil ends 25 in its axial cross section.

For example, each of the oil guides 35 has one of the configurations illustrated in FIGS. 3A to 3D.

A projected position of each of the circumferential edges 36a and 36b of the oil guide 35 for the first coil end 25 on the horizontal reference plane H is located between the inner periphery Xi of the first coil end 25 on the horizontal reference plane H and the outer periphery Xo of the first coil end 25 on the horizontal reference plane H. For example, the oil guide 35 covers the range from sixty percent to eighty percent of the top half of a corresponding one of the first and second coil ends 25.

In the fourth embodiment, the projected position of one circumferential edge 36a of the oil guide 35 for the top left half of the first coil end 25 in FIG. 13 on the horizontal plane H is close to the outer periphery Xo of the first coil end 25 on the horizontal reference plane H. In contrast, the projected position of the other circumferential edge 36b of the oil guide 35 for the top right half of the first coil end 25 in FIG. 13 on the horizontal plane H is close to the inner periphery Xi of the first coil end 25 on the horizontal reference plane H.

In addition, the rotary electric machine 4 is comprised of the pair of cylindrical oil recovery sheets 50 like the third embodiment, and a pair of cylindrical oil recovery sheets 55 each made of, for example, heat resistant resin. Each of the oil recovery sheets 55 is placed over the outer periphery of the bottom half of a corresponding one of the first and second coil ends 25 with a clearance therebetween. In other words, a band-like oil recovery sheet 55 is configured to substantially cover the whole of the bottom half of each of the first and second coil ends 25 from its radially outward.

Each oil recovery sheet 55 has an outwardly curved shape in its lateral cross section along the circumferential direction of the bottom half of a corresponding coil end 25 with the same curvature as the curvature of the corresponding coil end 25 in its circumferential cross section. Each oil recovery sheet 55 is a member adapted to block oil from passing therethrough and recover it thereon. For example, the clearance is determined to have capillary action that causes oil to flow therethrough.

Specifically, the oil guide 35 is mounted on the top half of the outer surface of each of the first and second coil ends 25, and the oil recovery sheet 55 is mounted on the bottom half of the outer surface of each of the first and second coil ends 25.

With the configuration of the rotary electric machine 4, if the flow rate of oil supplied from each oil supply 40 above the first coil end 25 is relatively high, a part of the oil passes through the oil guide 35 (see arrows La), flows through the first coil end 25 to be recovered by the oil recovery sheet 50, and thereafter flows along the outer surface of the oil recovery sheet 50 while being in contact with the inner periphery of the first coil end 25 up to the bottom of the first coil end 25 (see arrows Lc). While the oil is guided to flow along the outer surface of the oil recovery sheet 50 in the bottom half of the first coil end 25, parts of the oil fall by their gravities through the bottom half of the first coil end 25 (see dashed arrows in FIG. 13).

In addition, an alternative part of the oil falling along the outer surface of the oil guide 35 drops at each edge 36 of the oil guide 35 downward (see arrows Lb).

After dropping downward at the first circumferential edge 36a of the coil guide 35, the oil Lb is recovered by the oil recovery sheet 55 because the projected position of the first circumferential edge 36a on the horizontal reference plane H is close to the to the outer periphery Xo of the first coil end 25 on the horizontal reference plane H. Thereafter, the recovered oil is guided along the inner surface of the oil recovery sheet 55 up to the bottom of the first coil end 25 while being in contact with the outer periphery of the first coil end 25. A part of the oil being guided along the inner surface of the oil recovery sheet 55 flows through some the turn portions of the bottom half of the first coil end 25; these turn portions are directed downward. Thus, it is possible to sufficiently cool these turn portions of the first coil end 25.

In addition, after dropping downward at the second circumferential edge 36b of the coil guide 35, the oil Lb is recovered by the oil recovery sheet 55 because the projected position of the second circumferential edge 36b on the horizontal reference plane H is close to the to the inner periphery Xi of the first coil end 25 on the horizontal reference plane H. Thereafter, the recovered oil is guided along the outer surface of the oil recovery sheet 50 up to the bottom of the first coil end 25 while being in contact with the inner periphery of the first coil end 25.

The oil guiding function of the oil guide 35 and the oil recovering and guiding functions of the oil recovery sheet 55 for the second coil end 25 can be identical to that of the oil guide 35 and those of the oil recovery sheet 55 for the first coil end 25.

Figure 14:
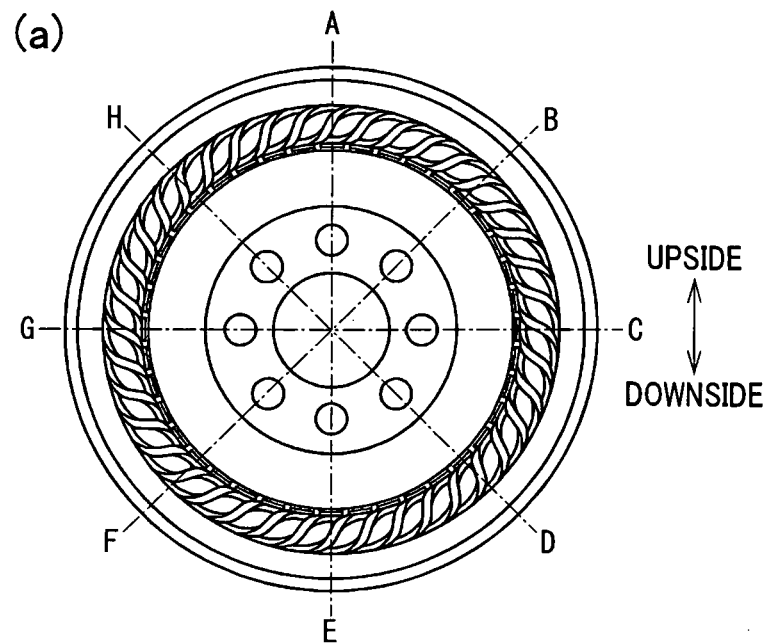
FIG. 14 includes a radar chart illustrating an actually measured temperature distribution of one coil end of each of the normally operating rotary electric machines according to the third and fourth embodiments at different circumferential points A to H as variables represented on axes of the radar chart.
Figure 14:
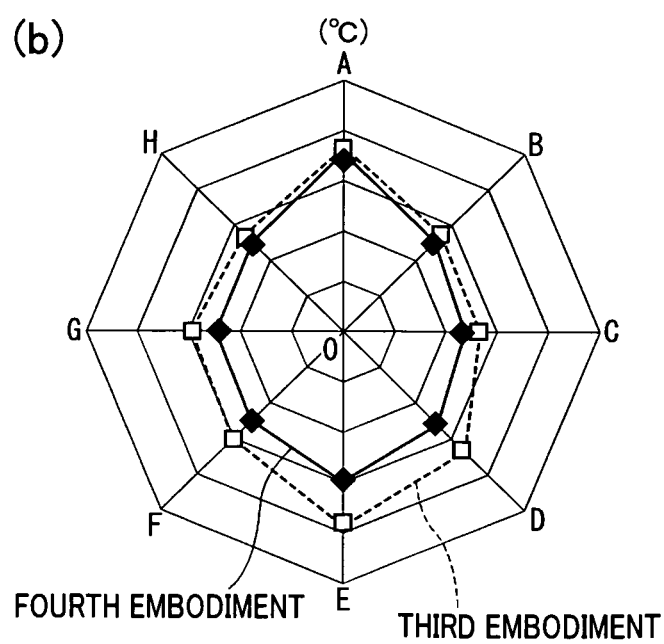

(b) of FIG. 14 is a radar chart illustrating an actually measured temperature distribution of one coil end 25 of each of the normally operating rotary electric machines 3 and 4 at different circumferential points A to H (see (a) of FIG. 14) as variables represented on axes of the radar chart.

As clearly seen by comparison between the actually measured temperature distribution of one coil end 25 of the rotary electric machine 3 (see dashed lines) and that of a corresponding one coil end 25 of the rotary electric machine 4 (see solid lines), the temperature of the one coil end 25 of the rotary electric machine 4 at each of the circumference points B to H is lower than that of the corresponding one coil end 25 of the rotary electric machine 3 at a corresponding one of the circumference points B to H.

Particularly, the temperature at each of the circumferential points D and E in the bottom half of the one coil end 25 of the rotary electric machine 4 is greatly different from that at a corresponding one of the circumferential points D and E in the bottom half of the one coil end 25 of the rotary electric machine 3.

Thus, the rotary electric machine 4 according to the fourth embodiment achieves sufficient cooling capability for the coil ends 25 even if the flow rate of oil supplied from the oil supplies 40 is high.

Fifth Embodiment

A rotary electric machine 5 according to the fifth embodiment of the present disclosure will be described hereinafter with reference to FIG. 15.

The structure and/or functions of the rotary electric machine 5 according to the fifth embodiment are different from those of the rotary electric machine 4 according to the fourth embodiment by the following points. So, the different points will be mainly described hereinafter.

Figure 15:
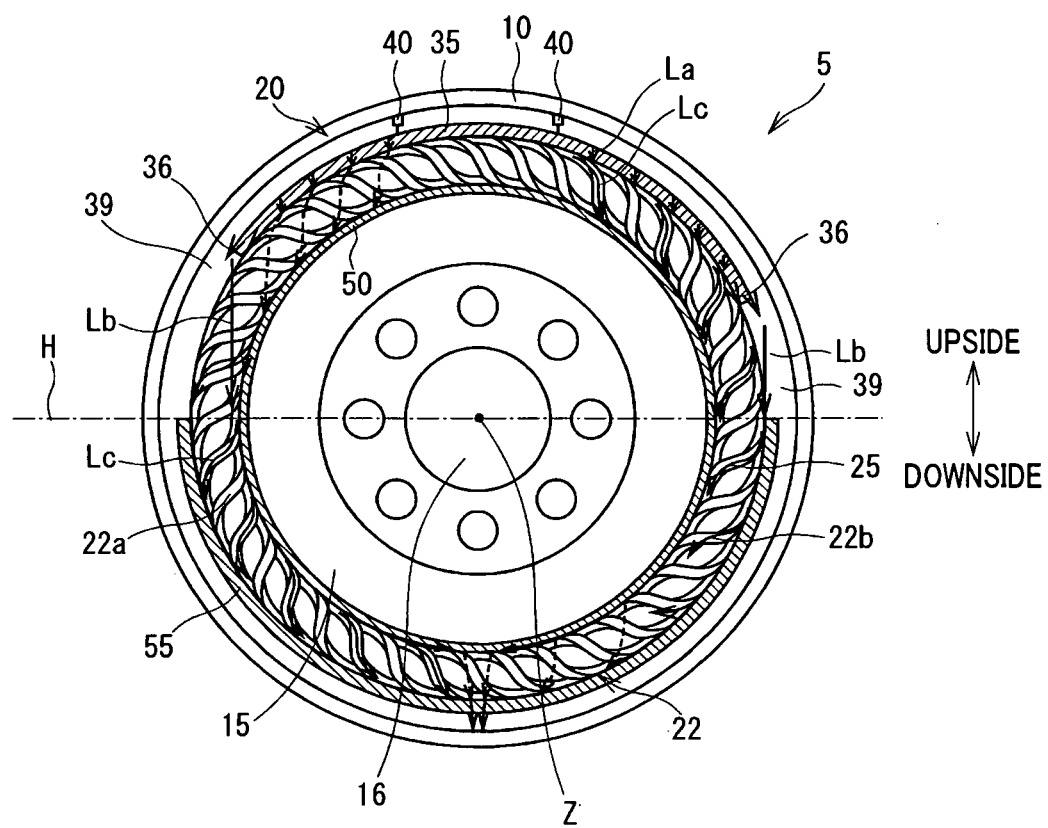
FIG. 15 is a schematic axial end view of a rotary electric machine according to the fifth embodiment of the present disclosure.

Referring to FIG. 15, each U-shaped turn portion projects from a corresponding slot (first slot) 23, and returns into a corresponding slot (second slot) 23 advancing from the first slot 23 in clockwise direction in FIG. 15. In other words, the U-shaped turn portion of each conductor segment extends from the outermost end of a first slot 23 to the innermost end of a second slot 23 apart from the first slot 23 in clockwise direction in FIG. 15.

In addition, the projected position of one circumferential edge 36a of the oil guide 35 for the top left half of the first coil end 25 in FIG. 15 on the horizontal plane H is close to the inner periphery Xi of the first coil end 25 on the horizontal reference plane H. In contrast, the projected position of the other circumferential edge 36b of the oil guide 35 for the top right half of the first coil end 25 in FIG. 15 on the horizontal plane H is close to the outer periphery Xo of the first coil end 25 on the horizontal reference plane H.

The oil guiding and recovering function of the rotary electric machine 5 are substantially identical to those of the rotary electric machine 4, and therefore, the rotary electric machine 5 according to the fifth embodiment achieves the same technical advantages as the rotary electric machine 4.

Sixth Embodiment

In each of the fourth and fifth embodiments, the oil guide 30, the oil recovery sheet 50, and the oil recovery sheet 55 are placed to cover each of the first and second coil ends 25 as separated members. Normally, the placement of the oil guide 30 to cover the first coil end 25, the placement of the oil recovery sheet 50 to cover the first coil end 25, and the placement of the oil recovery sheet 55 to cover the first coil end 25 are separately carried out. However, these placement works may be low in work efficiency.

A rotary electric machine according to the sixth embodiment has therefore improved work efficiency for placement of the oil guide 30, the oil recovery sheet 50, and the oil recovery sheet 55 on or over each of the first and second coil ends 25. Specifically, the rotary electric machine according to the sixth embodiment is comprised of a pair of guide assemblies 600 each constructed by a combination of the oil guide 30, the oil recovery sheet 50, and the oil recovery sheet 55.

Figure 16A:
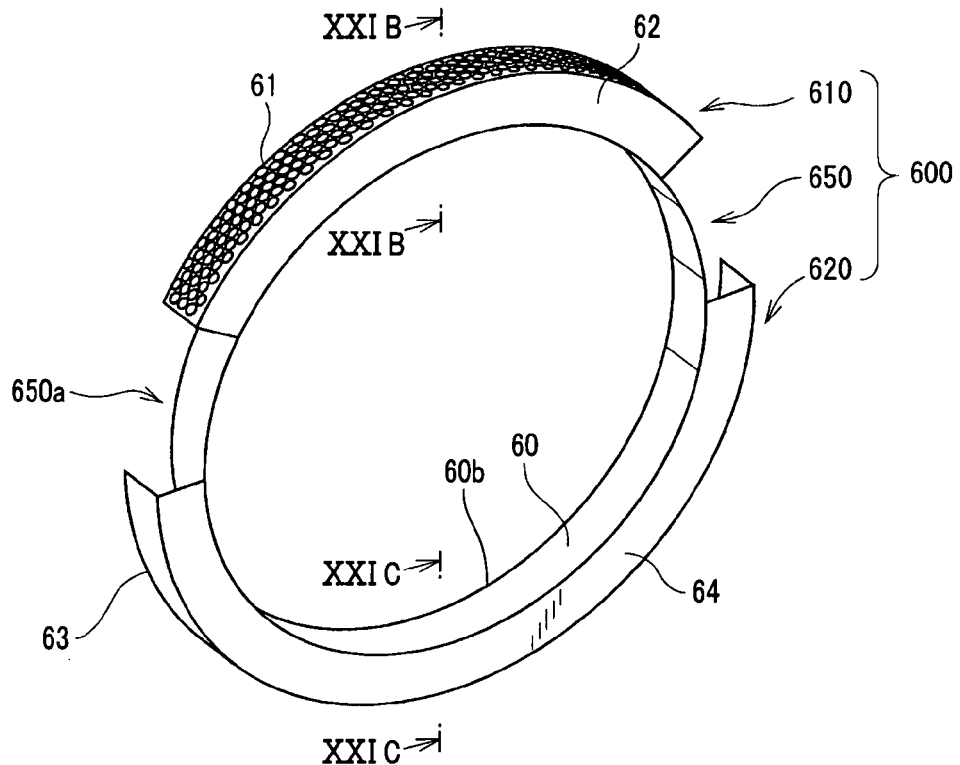
FIG. 16A is a schematic enlarged perspective view of a guide assembly according to the sixth embodiment of the present disclosure.
Figure 16B:
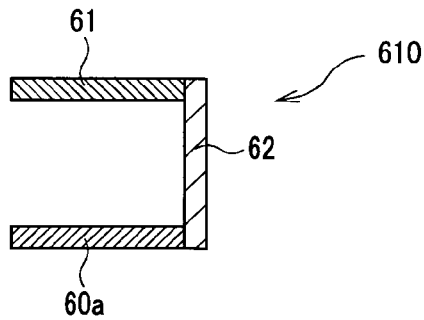
FIG. 16B is a cross sectional view taken on line XVIB-XVIB in FIG. 16A.
Figure 16C:
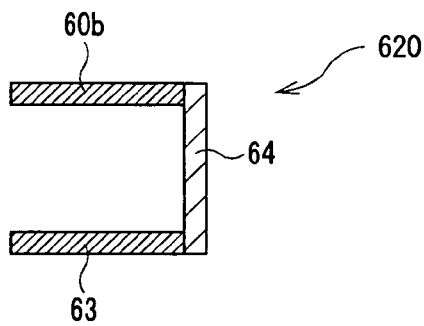
FIG. 16C is a cross sectional view taken on line XVIC-XVIC in FIG. 16A.

FIG. 16A is a schematic enlarged perspective view of a guide assembly 600, FIG. 16B is a cross sectional view taken on line XVIB-XVIB in FIG. 16A, and FIG. 16C is a cross sectional view taken on line XVIC-XVIC in FIG. 16A.

As illustrated in FIG. 16A, the guide assembly 600 is a cylindrical integrated molded product. Specifically, the guide assembly 600 consists of a cylindrical base wall 60, a first wall 61, a second wall 62, a third wall 63, and a fourth wall 64. The cylindrical base wall 60 has a size fittable in the inner periphery of each of the first and second coil ends 25 with the clearance CL therebetween.

The second wall 62 has a circular arc shape with a curvature that is the same as an upper half segment 60a of the base wall 60, and continuously extends outwardly from one edge of the segment 60a of the base wall 60 to be orthogonal to the segment 60a of the base wall 60. The first wall 61 has a circular arc shape with a curvature that is the same as the segment 60a of the base wall 60, and continuously extends from one outer edge of the second wall 62 to be orthogonal to the second wall 62 and to be opposite to the segment 60a of the base wall 60. That is, the segment 60a of the base wall 60, the first wall 61, and the second wall 62 constitute a first composite component 610 with a substantially U-shape in an axial cross section of the base wall 60.

The fourth wall 64 has a semi-circular ring shape with a curvature that is the same as a lower half segment 60b of the base wall 60; this segment 60b faces the segment 60a. The fourth wall 64 continuously extends outwardly from one edge of the segment 60b of the base wall 60 to be orthogonal to the segment 60b of the base wall 60. The third wall 63 has a circular arc shape with a curvature that is the same as the segment 60b of the base wall 60, and continuously extends from one outer edge of the fourth wall 64 to be orthogonal to the fourth wall 64 and to be opposite to the segment 60b of the base wall 60. That is, the segment 60b of the base wall 60, the third wall 63, and the fourth wall 64 constitute a second composite component 620 with a substantially U-shape in an axial cross section of the base wall 60.

A first space 650a is formed between one circumferential end of the segment 60a and one circumferential end of the segment 60b, which are opposite to each other, and a second space 650b is formed between the other circumferential end of the segment 60a and the other circumferential end of the segment 60b, which are opposite to each other.

The first wall 61 serves as the oil guide 30, the third wall 63 serves as the oil recovery sheet 55, and the base wall 60 serves as the oil recovery sheet 50. Each of the second and fourth walls 62 and 64 can be made of any material, for example, a material that is the same as a material of a corresponding one of the first and second walls 61 and 62. The first and second spaces 650a and 650b serve as the first space 39 between the circumferential edge 36a and the horizontal reference plane H and the second space 39 between the circumferential edge 36b and the horizontal reference plane H, respectively.

Figure 17:
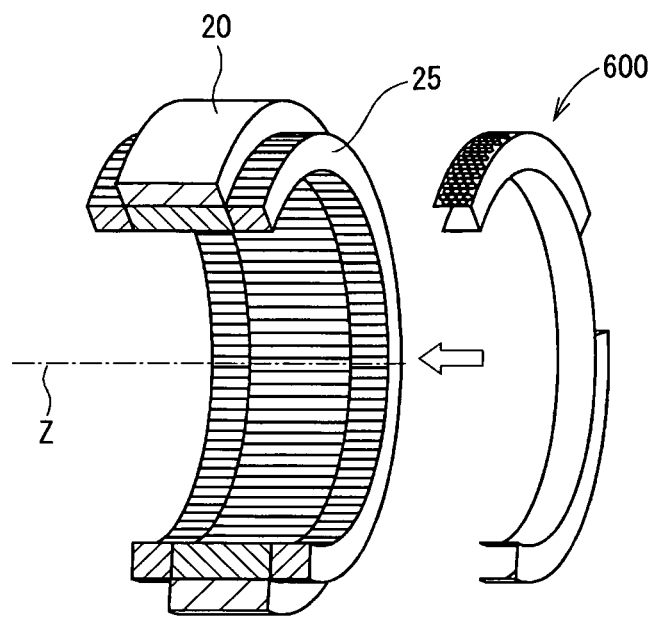
FIG. 17 is a view schematically illustrating how to attach the guide assembly illustrated in FIG. 16A to the first coil end of a stator of a rotary electric machine.

FIG. 17 schematically illustrates how to attach the guide assembly 600 to the first coil end 25 of the stator 20.

After the stator 20 is installed in the housing 10 such that the center axis Z of the stator 20 is directed horizontally, the guide assembly 600 is attached from radially outward of the first coil end 25 such that: the base wall 60 is fitted in the inner periphery of the first coil end 25 with the clearance CL, the first wall 61 is placed on or over a top part of the top half of the first coil end 25, and the third wall 63 is placed on or over the bottom half of the first coil end 25. The second wall 62 is placed to cover an axial end of the top part of the top half of the first coil end 25, and the fourth wall 64 is placed to cover an axial end of the bottom half of the first coil end 25.

This makes it easy to serve the first wall 61 as the oil guide 30, the third wall 63 as the oil recovery sheet 55, and the base wall 60 as the oil recovery sheet 50.

As described above, the rotary electric machine according to the sixth embodiment is provided with the guide assembly 600 that serves as the oil guide 30, the oil recovery sheet 50, and the oil recovery sheet 55; this guide assembly 600 is easily attached to one coil end 25 as compared with when the oil guide 30, the oil recovery sheet 50, and the oil recovery sheet 55 are individually attached to one coil end 25. This results in improvement of the attachment work of the oil guide 30, the oil recovery sheet 50, and the oil recovery sheet 55 to one coil end 25.

Note that the first and second composite components 610 and 620 can be separately formed. In this case, the first composite component 610 is comprised of a circular arc wall corresponding to the segment 60a, the first wall 61, and the second wall 62, and the second composite component 620 is comprised of a semi-circular ring wall corresponding to the segment 60a, the third wall 63, and the fourth wall 64.

Seventh Embodiment

A rotary electric machine 7 according to the seventh embodiment of the present disclosure will be described hereinafter with reference to FIGS. 18A to 21B.

The structure and/or functions of the rotary electric machine 7 according to the seventh embodiment are different from those of the rotary electric machine 4 according to the fourth embodiment by the following points. So, the different points will be mainly described hereinafter.

Figure 18A:
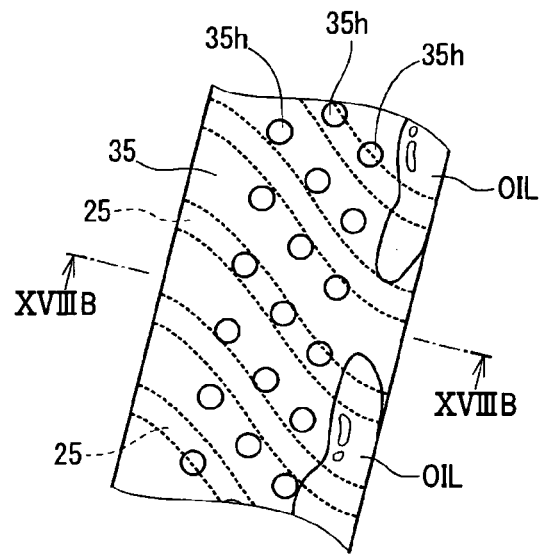
FIG. 18A is a schematic view of a part of the oil guide illustrated in FIG. 13 as viewed from arrow XVIIIA while the housing is omitted in illustration.
Figure 18B:
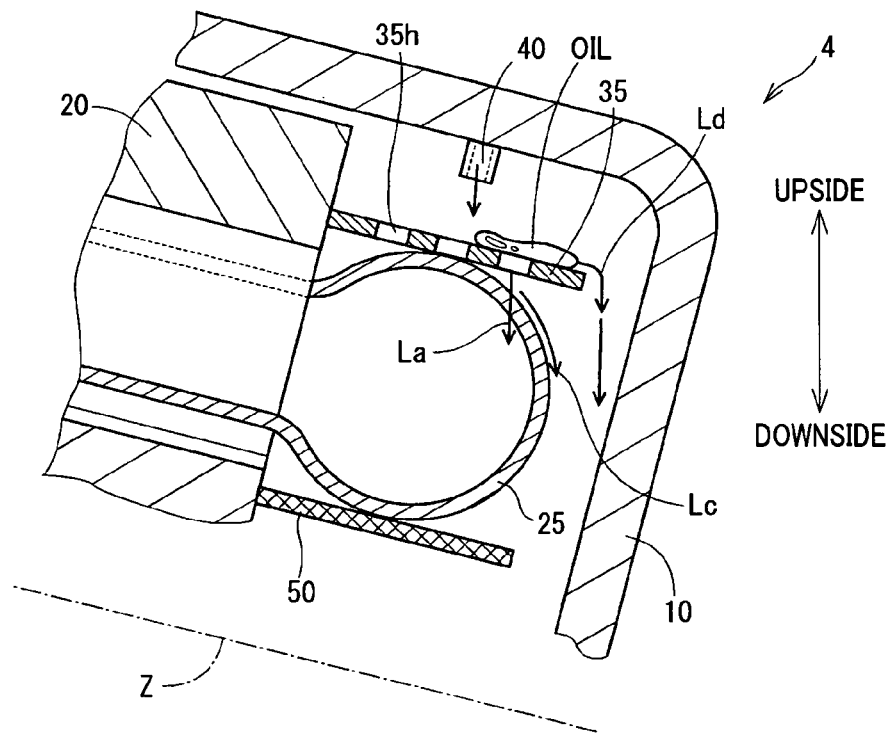
FIG. 18B is a schematic cross sectional view taken on line XVIIIBA-XVIIIB in FIG. 18A.

FIGS. 18A and 18B schematically illustrate the behavior of oil supplied on the oil guide 35 for the first coil end 25 of the rotary electric machine 4 illustrated in FIG. 13 when the vehicle is driving up or down a slope. Assuming that the vehicle is a front-engine rear-drive vehicle and the rotary electric machine 4 is installed in the vehicle such that the center axis Z is in parallel to the front-back direction, when the vehicle drives up or down a slope, the center axis Z of the rotary electric machine 4 is inclined with respect to the horizontal direction.

FIG. 18A is a schematic view of a part of the oil guide 35 illustrated in FIG. 13 as viewed from arrow XVIIIA while the housing 10 is omitted in illustration, and FIG. 18B is a schematic cross sectional view taken on line XVIIIB-XVIIIB in FIG. 18A. In FIG. 18A, reference characters 35h represent holes corresponding to the holes 30h of the oil guide 30.

Note that, in FIG. 18B, the vehicle drives up a slope to the left so that the center axis Z of the rotary electric machine 4 is inclined with respect to the horizontal direction with its front side up and its rear side down. Of course, the subject matter of the seventh embodiment described later can be implemented when the vehicle drives down a slope to the left so that the center axis Z of the rotary electric machine 4 is inclined with respect to the horizontal direction with its front side down and its rear side up. In addition, the oil guide 35 has a linear shape in its axial cross section in substantially parallel to the axial direction of the stator coil 22 (see FIGS. 8A and 14B).

Referring to FIG. 18B, the inclination of the center axis Z with respect to the horizontal direction when the vehicle drives the slope causes a major part of oil on the oil guide 35 for the first coil end 25 to drop downward via an axial edge of the top portion of the oil guide 35 without being in contact with the first coil end 25 (see arrows Ld) and the remaining minor part of the oil to fall through the oil guide 35 while being in contact with the first coil end 25 (see arrow Lc). This may reduce the wetted area of the first coil end 25, resulting in a decrease of the cooling capability of the rotary electric machine 4 for the stator coil 22. Each of the rotary electric machines according to the first to third, fifth, and sixth embodiments can have the same risk set forth above.

The rotary electric machine 7 according to the seventh embodiment is therefore designed to reduce such a risk.

Specifically, the rotary electric machine 7 is comprised of a pair of oil guides 70 each placed on or over a top portion of the top half of a corresponding one of the first and second coil ends 25 with both first and second spaces 39 between the circumferential edges 36a and 36b of the oil guide 70 and the horizontal reference plane H. Note that the rotary electric machine 7 is installed in the vehicle such that the center axis Z is in parallel to the front-back direction.

Figure 19:
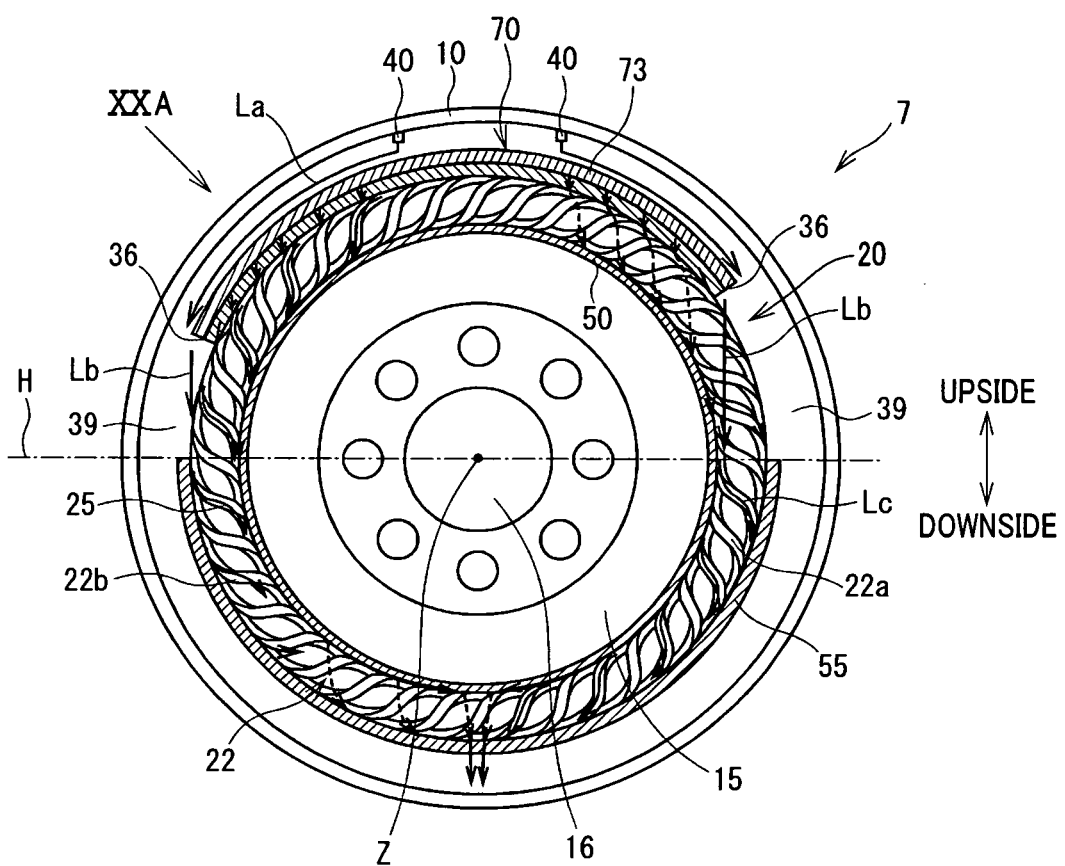
FIG. 19 is a schematic axial end view of a rotary electric machine according to the seventh embodiment of the present disclosure.
Figure 20A:
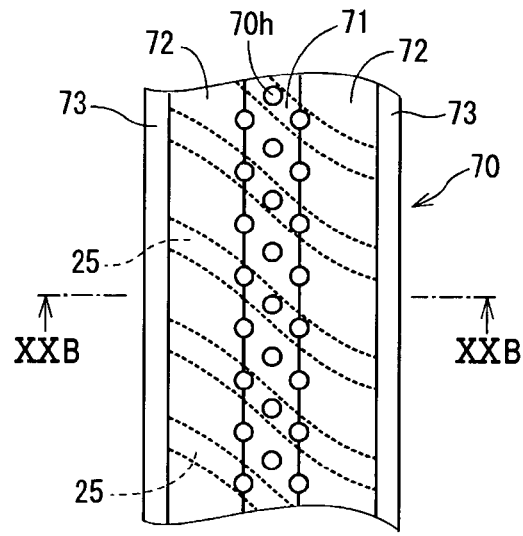
FIG. 20A is a schematic view of a part of an oil guide illustrated in FIG. 19 as viewed from arrow XXA while the housing is omitted in illustration.
Figure 20B:
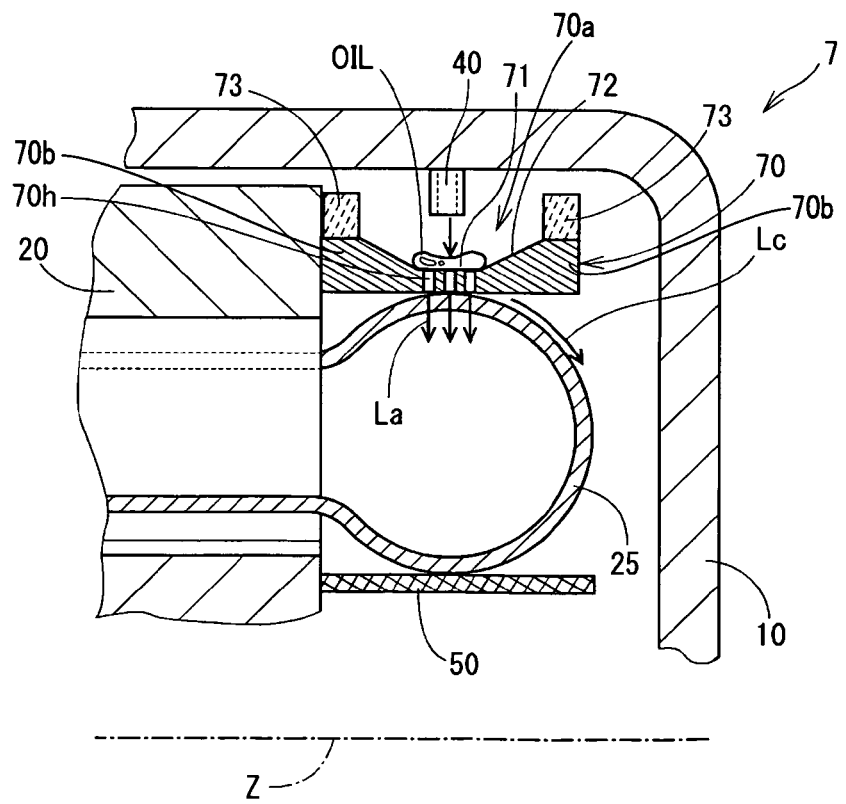
FIG. 20B is a schematic cross sectional view taken on line XXB-XXB in FIG. 20A.
Figure 21A:
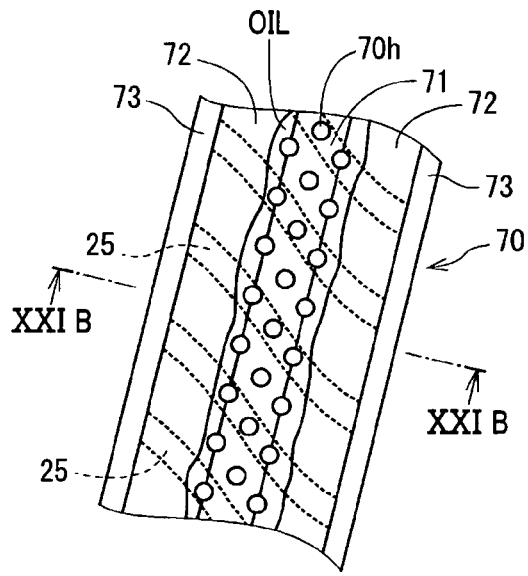
FIG. 21A is a schematic view of the part of the oil guide illustrated in FIG. 19 as viewed from arrow XXA while the housing is omitted in illustration when the center axis of the rotary electric machine is inclined with respect to the horizontal direction.
Figure 21B:
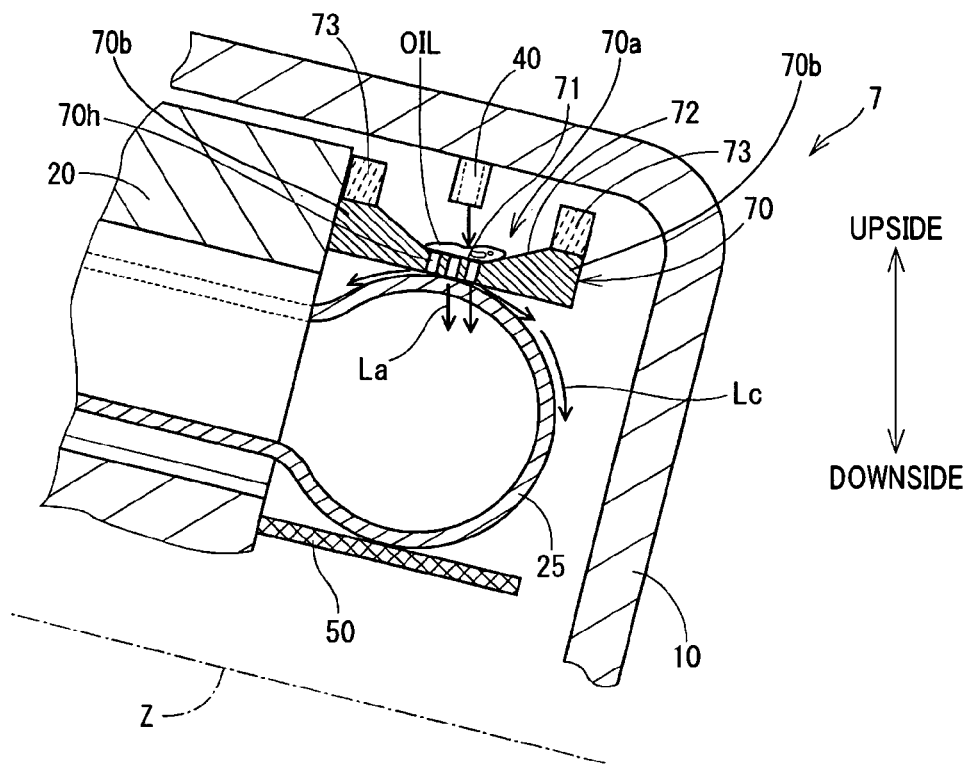
FIG. 21B is a schematic cross sectional view taken on line XXIB-XXIB in FIG. 21A.

FIG. 19 is a schematic axial end view of the rotary electric machine 7 according to the seventh embodiment of the present disclosure. FIG. 20A is a schematic view of a part of an oil guide 70 illustrated in FIG. 19 as viewed from arrow XXA while the housing 10 is omitted in illustration, and FIG. 20B is a schematic cross sectional view taken on line XXB-XXB in FIG. 20A. Each of the oil guides 70 has a linear shape in its axial cross section in substantially parallel to the axial direction of the stator coil 22 (see FIG. 20B).

Each of the oil guides 70 is comprised of a platy member extending in a circumferential direction of a corresponding coil end 25. The platy member is provided with a groove 70a between both circumferential edges 70b thereof. The groove 70a is formed in an outer surface of the platy member facing the housing 10 along the extending direction thereof. The groove 70a is comprised of a bottom portion 71 located at a middle portion in a width direction (lateral direction) of the platy member, and a pair of inclined sides 72 continuously extending from both lateral sides of the bottom portion 71 outwardly up to both circumferential edges 70b of the platy member. That is, the height of the bottom portion 71 is lower than the height of each of the circumferential edges 70b of the platy member, so that each of the inclined surfaces 72 extends obliquely downward from a corresponding one of the circumferential edges 70b up to a corresponding one of the lateral sides of the bottom portion 71.

The bottom portion 71 is formed with a plurality of holes 70h therethrough along the extending direction.

The platy member 70 is also provided with block walls 73 each projecting radially upward from the top of a corresponding one of the circumferential sides 70b thereof.

The oil guide 70 is placed on or over the top portion of the first coil end 25 such that the bottom portion 71 is located to face the apex of the top portion of the first coil end 25 in its axial direction.

When the vehicle drives up or down a slope so that the center axis Z of the rotary electric machine 7 parallel to the front-back direction of the vehicle is inclined with respect to the horizontal direction (see FIGS. 21A and 21B), oil supplied from the oil supplies 40 falls along at least one of the inclined surfaces 72 to the bottom portion 71, so that the oil is collected on the bottom portion 71. Thus, the oil collected on the bottom portion 71 falls through the holes 70h to the top portion of the first coil end 25 (see arrows La). Thereafter, a part of the oil slidably drops along the first coil end 25 based on the interfacial tension between the first coil end 25 and the part of the oil up to the bottom of the first coil end 25 (see arrows Lc). This allows the part of the oil to wet the turn portions of the first coil end 25 to cool them.

Even if the center axis Z of the rotary electric machine 7 is greatly inclined with respect to the horizontal direction, the block walls 73 block the collected oil in the groove 70a from falling out of the groove 70a. Thus, it is possible to stably supply oil to the first coil end 25 of the stator coil 22 even if the center axis Z of the rotary electric machine 7 is inclined with respect to the front-back direction of the vehicle. This more improves robust performance of the rotary electric machine 7.

Particularly, because the rotary electric machine 7 according to the seventh embodiment is configured to stably collect oil supplied from a corresponding pair of oil supplies 40 in the groove 70a, the supply pressure of the oil from the corresponding pair of oil supplies 40 can be reduced or set to zero. Thus, each oil supply 40 is capable of only dropping oil downward without applying pressure to the oil, thus eliminating any power supply source for applying pressure to oil, such as an oil pump. This reduces the rotary electric machine 7 in cost.

The rotary electric machine 7 can be installed in the vehicle, which is, for example, a front-engine front-drive vehicle, such that the center axis Z is in parallel to the width direction (right and left direction). In this modification, even if the vehicle is tilted with its left side down (or up) and its right side up (or down) so that the center axis Z of the rotary electric machine 7 parallel to the width direction of the vehicle is inclined with respect to the horizontal direction, it is possible to stably supply oil to the first coil end 25 of the stator coil 22, thus improving robust performance of the rotary electric machine 7.

Each of the inclined sides 72 can be flat or concavely curved. Each of the inclined sides 72 can be separated from a corresponding one of the lateral sides of the bottom portion 71. Each of the block walls 73 can be continuously formed from the top end of a corresponding one of the inclined sides 72. The block walls 73 can be eliminated, or only one block wall 73 can be provided.

Eighth Embodiment

A rotary electric machine 8 according to the eighth embodiment of the present disclosure will be described hereinafter with reference to FIGS. 22 to 25B.

The structure and/or functions of the rotary electric machine 8 according to the eighth embodiment are different from those of each of the rotary electric machines 4 and 7 according to the fourth and seventh embodiments by the following points. So, the different points will be mainly described hereinafter.

The rotary electric machine 8 is comprised of a pair of oil guides 75 each placed on or over a top portion of the top half of a corresponding one of the first and second coil ends 25 with both first and second spaces 39 between the circumferential edges 36a and 36b of the oil guide 75 and the horizontal reference plane H. Note that the rotary electric machine 8 is installed in the vehicle such that the center axis Z is in parallel to the front-back direction.

Figure 22:
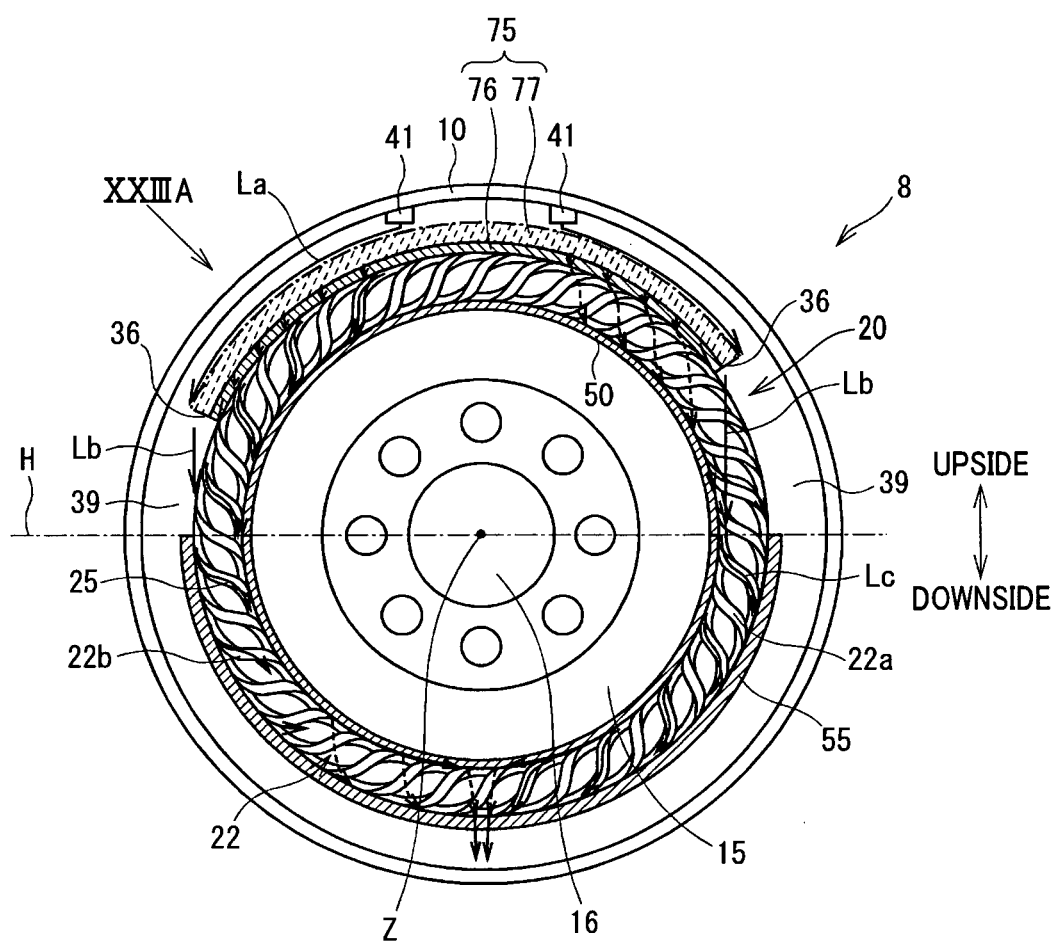
FIG. 22 is a schematic axial end view of a rotary electric machine according to the eighth embodiment of the present disclosure.
Figure 23A:
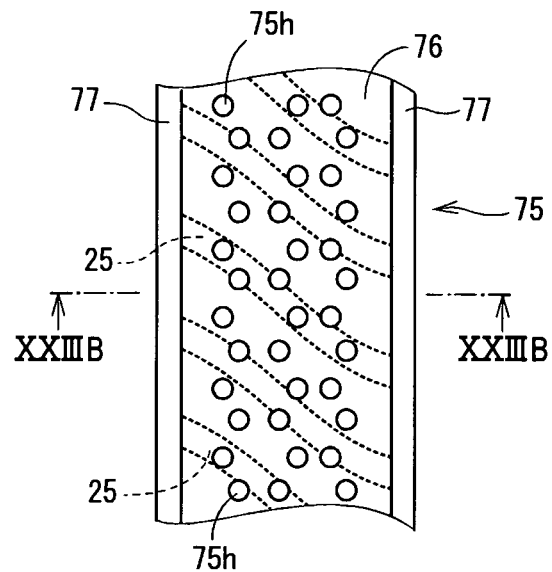
FIG. 23A is a schematic view of a part of an oil guide illustrated in FIG. 22 as viewed from arrow XXIIIA while the housing is omitted in illustration.
Figure 23B:
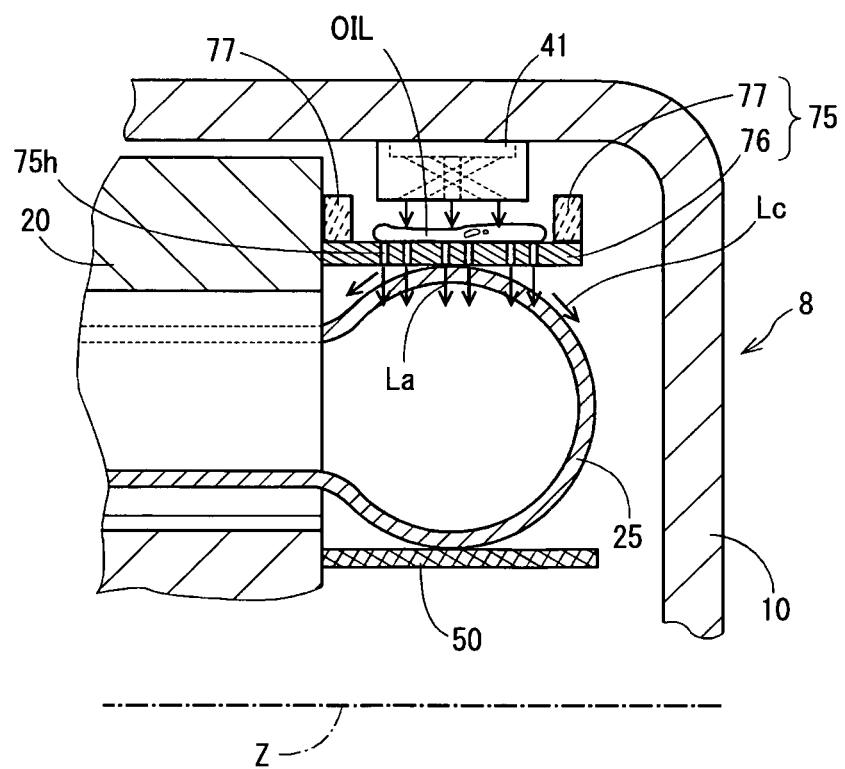
FIG. 23B is a schematic cross sectional view taken on line XXIIIB-XXIIIB in FIG. 23A.

FIG. 22 is a schematic axial end view of the rotary electric machine 8 according to the eighth embodiment of the present disclosure. FIG. 23A is a schematic view of a part of an oil guide 75 illustrated in FIG. 22 as viewed from arrow XXIIIA while the housing 10 is omitted in illustration, and FIG. 23B is a schematic cross sectional view taken on line XXIIIB-XXIIIB in FIG. 23A.

Each of the oil guides 75 is comprised of a platy base member 76 extending in a circumferential direction of a corresponding coil end 25. The base member 76 has a width in the axial direction (direction of the center axis Z) of the stator coil 22, which is substantially identical to an axial width of a corresponding coil end 25. The base member 76 is formed with a plurality of circular holes 75h therethrough along the extending direction of the base member 76 and along the axial direction of the stator coil 22. Each of the oil guides 75 is also comprised of block walls 77 respectively mounted on both circumferential side portions of the base member 76 and projecting radially upward therefrom.

The rotary electric machine 8 is also comprised of two pairs of oil supplies 41 different in configuration from the two pairs of oil supplies 40. The one pair of oil supplies 41 is mounted on the inner surface of the top wall of one end of the housing 10. The other pair of oil supplies 41 is mounted on the inner surface of the top wall of the other end of the housing 10. The oil supplies 41 of each pair are disposed symmetry with respect to an imaginary plane parallel to the height direction of the vehicle and passing through the center axis of the housing 10. For example, the oil supplies 41 of each pair are penetrated through the top wall of a corresponding end of the housing 10 to communicate with, for example, an oil source. That is, the oil supplies 41 of each pair are adapted to receive oil fed from the oil source, and to supply, to the inside of the housing 10, the oil as a coolant.

Next, the configuration of an oil supply 41 will be described hereinafter with reference to FIGS. 24A to 24D.

The oil supply 41 has a substantially rectangular parallelepiped frame 41f. The frame 41f has a top wall 41w to be mounted on the inner surface of the top wall of one end of the housing 10. The frame 41f has a grooved container 410 formed in the top wall 41w, which serves as an oil container 410 in which oil supplied from an oil supply source is contained. The frame 41f has a bottom wall 41b opposite to the top wall 41w. The frame 41f is formed at its inside with first, second, and third passages 411, 412, and 413 that allow the grooved container 410 to communicate with the bottom wall 41b. Note that the observer's left direction of FIG. 24A corresponds to the front direction of the vehicle, and the observer's right direction of FIG. 24A corresponds to the back direction of the vehicle.

Figure 24A:
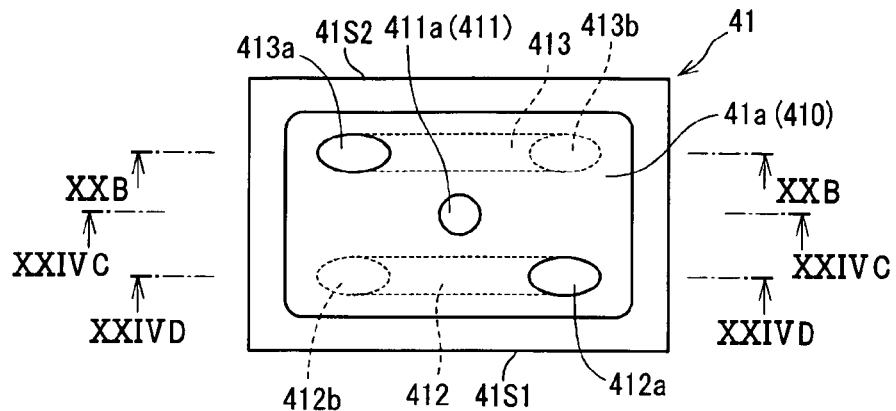
FIG. 24A is a schematic view of an oil supply according to the eighth embodiment as being viewed from its oil supply side.
Figure 24B:
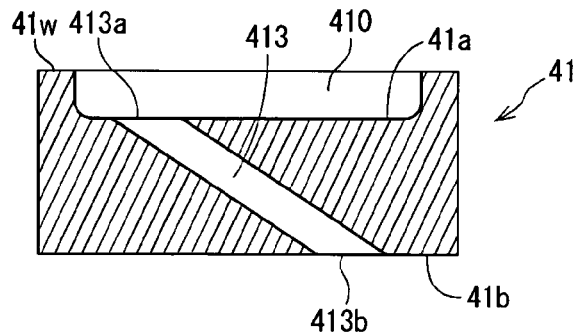
FIG. 24B is a schematic cross sectional view taken on line XXIVB-XXIVB in FIG. 24A.
Figure 24C:
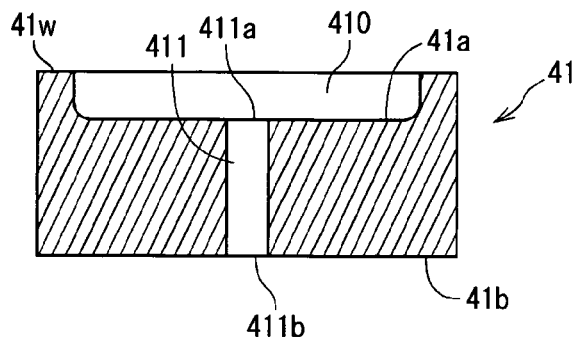
FIG. 24C is a schematic cross sectional view taken on line XXIVC-XXIVC in FIG. 24A.

Referring to FIGS. 24A and 24C, the first passage 411 has, for example, a circular shape in its lateral cross section, and is formed between the center of an inner bottom wall 41a of the grooved container 410 and the center of the bottom wall 41b to be orthogonal to the inner bottom wall 41a and the bottom wall 41b. In other words, the first passage 411 is formed in the frame 41f to be orthogonal to the center axis Z of the rotary electric machine 8, and is provided with a first inlet 411a opening the center of the inner bottom wall 41a of the grooved container 410, and a first outlet 411b opening the center of the bottom wall 41b. That is, the grooved container 410 communicates with the first outlet 411b through the first passage 411.

Figure 24D:
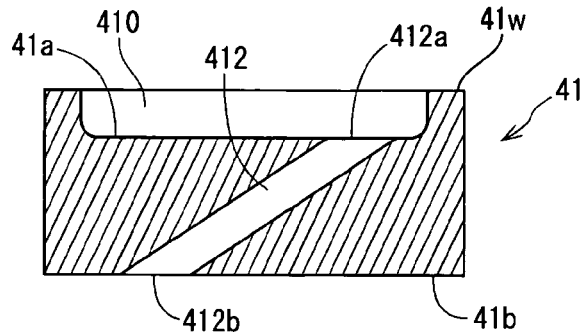
FIG. 24D is a schematic cross sectional view taken on line XXIVD-XXIVD in FIG. 24A.
Figure 25A:
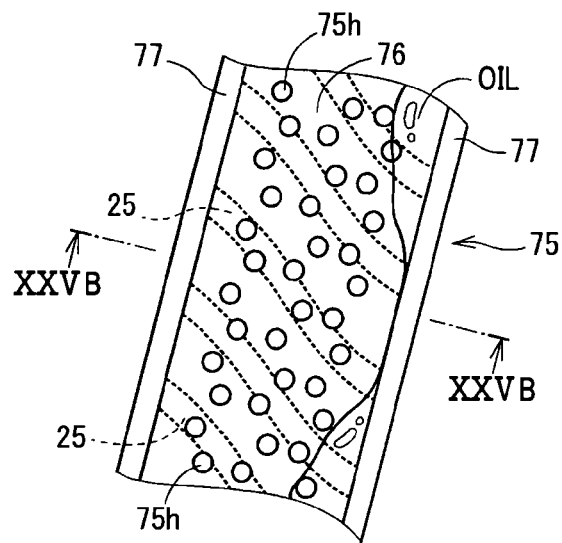
FIG. 25A is a schematic view of the part of the oil guide illustrated in FIG. 22 as viewed from arrow XXIIIA while the housing is omitted in illustration when the center axis of the rotary electric machine is inclined with respect to the horizontal direction.
Figure 25B:
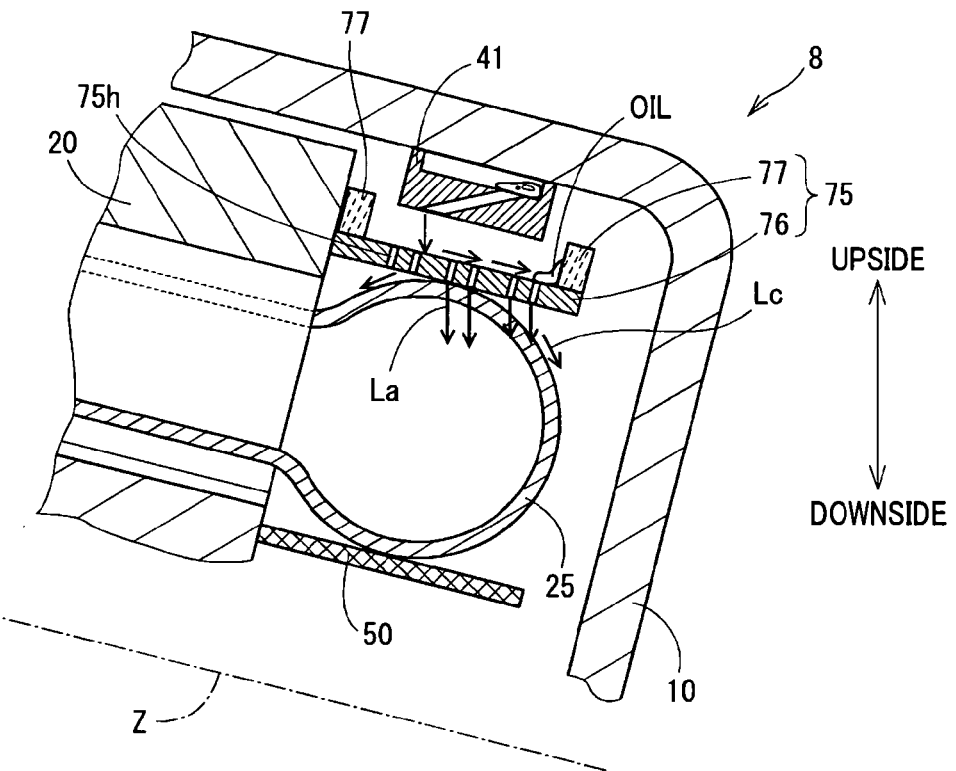
FIG. 25B is a schematic cross sectional view taken on line XXVB-XXVB in FIG. 25A.

Referring to FIGS. 24A and 24D, the second passage 412 has, for example, an ellipsoidal shape in its lateral cross section, and is formed close to one axial side wall 41s1 (lower side in FIG. 24A) of the frame 41f relative to the first passage 411 between the inner bottom wall 41a and the bottom wall 41b. Specifically, the second passage 412 is provided with a second inlet 412a opening the inner bottom wall 41a, and a second outlet 412b opening the bottom wall 41b. The second inlet 412a is located close to the one axial side wall 41s1 behind the first inlet 411a, and the second outlet 412b is located close to the one axial side wall 41s1 in front of the first inlet 411a.

Referring to FIGS. 24A and 24B, the third passage 413 has, for example, an ellipsoidal shape in its lateral cross section, and is formed close to the other axial side wall 41s2 (upper side in FIG. 24A) of the frame 41f relative to the first passage 411 between the inner bottom wall 41a and the bottom wall 41b. Specifically, the third passage 413 is provided with a third inlet 413a opening the inner bottom wall 41a, and a third outlet 413b opening the bottom wall 41b. The third inlet 413a is located close to the other axial side wall 41s2 in front of the first inlet 411a, and the third outlet 413b is located close to the other axial side wall 41s2 behind the first inlet 411a.

Preferably, a projected portion of the second passage 412 on an imaginary plane passing through the center axis of the first passage 411 in parallel to the axial direction of the stator coil 22 and a projected portion of the third passage 413 thereon are symmetric with each other about the center axis of the first passage 411.

The oil suppliers 41 of each pair are designed such that the second and third outlets 412b and 413b face the base member 76 between the block walls 77 in the axial direction of the stator coil 22. Four or more passages each allowing communications between the grooved container 410 and the bottom wall 41b can be formed in the frame 41f.

When the center axis Z of the rotary electric machine 7 parallel to the front-back direction of the vehicle is parallel to the horizontal direction (see FIGS. 23A and 23B), oil supplied through the housing 10 to an oil supply 41 for the first coil end 25 is charged in the grooved container 410 and falls through the first, second, and third passages 411 to 413 to the corresponding oil guide 75. Thereafter, the oil supplied to the oil guide 75 falls through the holes 75h to the top portion of the first coil end 25 (see arrows La). Thereafter, a part of the oil slidably drops along the first coil end 25 based on the interfacial tension between the first coil end 25 and the part of the oil up to the bottom of the first coil end 25 (see arrows Lc). This allows the part of the oil to wet the turn portions of the first coil end 25 to cool them.

On the other hand, when the vehicle drives up a slope to the left so that the center axis Z of the rotary electric machine 7 parallel to the front-back direction of the vehicle is inclined with respect to the horizontal direction with its front side up and its rear side down (see FIGS. 25A and 25B), oil supplied through the housing 10 to an oil supply 41 for the first coil end 25 is charged in the grooved container 410 and falls mainly through the second passage 412 to the corresponding oil guide 75. Thereafter, the oil supplied to the oil guide 75 falls through the holes 75h to the top portion of the first coil end 25 (see arrows La). Thereafter, a part of the oil slidably drops along the first coil end 25 based on the interfacial tension between the first coil end 25 and the part of the oil up to the bottom of the first coil end 25 (see arrows Lc). This allows the part of the oil to wet the turn portions of the first coil end 25 to cool them.

Similarly, when the vehicle drives down a slope to the left so that the center axis Z of the rotary electric machine 7 parallel to the front-back direction of the vehicle is inclined with respect to the horizontal direction with its front side down and its rear side up, oil supplied through the housing 10 to an oil supply 41 for the first coil end 25 is charged in the grooved container 410 and falls mainly through the third passage 413 to the corresponding oil guide 75. Thereafter, the oil supplied to the oil guide 75 falls through the holes 75h to the top portion of the first coil end 25. Thereafter, a part of the oil slidably drops along the first coil end 25 based on the interfacial tension between the first coil end 25 and the part of the oil up to the bottom of the first coil end 25. This allows the part of the oil to wet the turn portions of the first coil end 25 to cool them.

Even if a part of the oil supplied in the oil guide 75 slidably drops to the rear side of the vehicle without falling the holes 75h, the block walls 77 block the oil in the oil guide 75 from falling out of the oil guide 75. Thus, it is possible to stably supply oil to the first coil end 25 of the stator coil 22 even if the center axis Z of the rotary electric machine 7 is inclined with respect to the front-back direction of the vehicle. This more improves robust performance of the rotary electric machine 7.

Particularly, because the rotary electric machine 8 according to the eighth embodiment is configured to stably collect oil supplied from a corresponding pair of oil supplies 41 in the oil guide 75, the supply pressure of the oil from the corresponding pair of oil supplies 41 can be reduced or set to zero. Thus, each oil supply 41 is capable of only dropping oil downward without applying pressure to the oil, thus eliminating any power supply source for applying pressure to oil, such as an oil pump. This reduces the rotary electric machine 8 in cost.

The rotary electric machine 8 can be installed in the vehicle, which is, for example, a front-engine front-drive vehicle, such that the center axis Z is in parallel to the width direction (right and left direction). In this modification, even if the vehicle is tilted with its left side down (or up) and its right side up (or down) so that the center axis Z of the rotary electric machine 8 parallel to the width direction of the vehicle is inclined with respect to the horizontal direction, it is possible to stably supply oil to the first coil end 25 of the stator coil 22, thus improving robust performance of the rotary electric machine 7.

The block walls 77 can be eliminated, or only one block wall 77 can be provided.

In each of the first to eighth embodiments, oil is used as a coolant for cooling the stator coil 22, but another material can be used as a coolant for cooling the stator coil 22. In each of the first to eighth embodiments, oil can be sprayed or injected to a corresponding oil guide. As described above, oil can be supplied to an oil guide of each of the first to eighth embodiments by only the gravity of the oil without supply pressure if the oil falls downward to the oil guide.

In each of the first to sixth embodiments, oil guides are provided to improve the cooling capability of a corresponding rotary electric machine for the stator coil, and more particularly, in each of the third to eighth embodiments, an oil recovery sheet is additionally provided to further improve the cooling capability of a corresponding rotary electric machine. However, the present disclosure is not limited to these configurations. Specifically, in each of the first to eighth embodiments, an oil recovery sheet can be only provided to improve the cooling capability of a corresponding rotary electric machine for the stator coil.

Figure 26A:
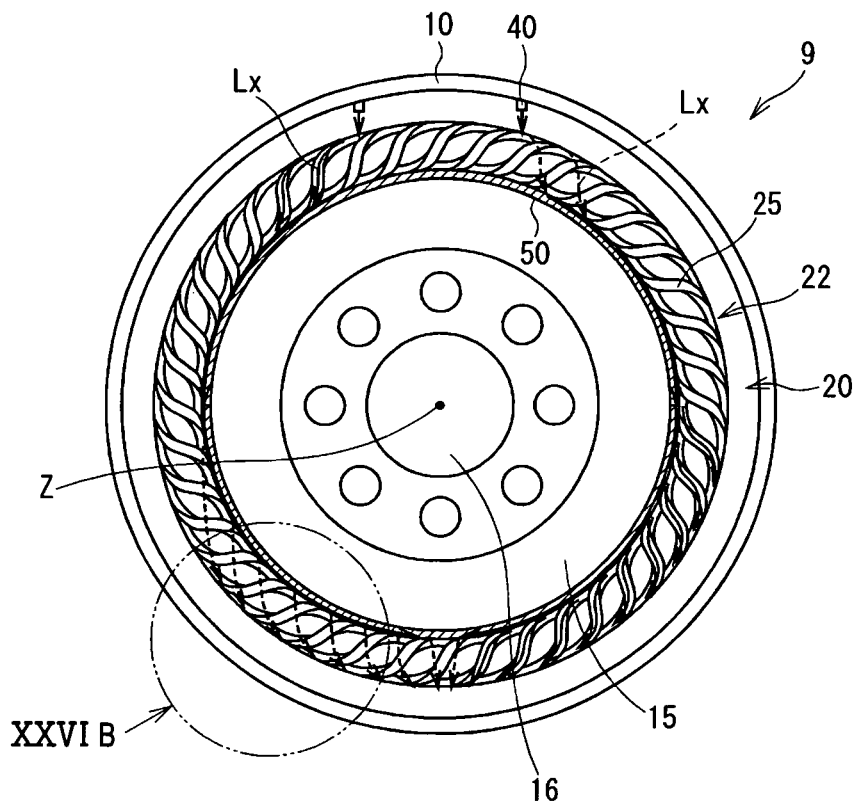
FIG. 26A is a schematic enlarged view of the first coil end of a rotary electric machine according to a first modification of the first embodiment of the present disclosure.
Figure 26B:
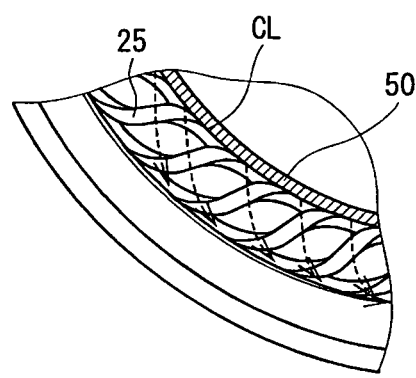
FIG. 26B is a partially schematic enlarged view of a part of the bottom half of the first coil end of the rotary electric machine as viewed from arrow XXVIB in FIG. 26A.

For example, FIG. 26A is a schematic enlarged view of the first coil end 25 of a rotary electric machine 9 according to a first modification of the first embodiment of the present disclosure. FIG. 26B is a partially schematic enlarged view of a part of the bottom half of the first coil end of the rotary electric machine 9 as viewed from arrow XXVIB in FIG. 26A.

The rotary electric machine 9 is provided with the pair of cylindrical oil recovery sheets 50 without provided with the pair of oil guides 30.

Each of the oil recovery sheets 50 is placed over the inner periphery of a corresponding one of the first and second coil ends 25 with a clearance CL therebetween. In other words, a band-like oil recovery sheet 50 is configured to cover each of the first and second coil ends 25 from its radially inward. Each of the oil recovery sheets 50 is a member adapted to block oil from passing therethrough and recover it thereon. For example, the clearance CL is determined to have capillary action that causes oil to flow therethrough.

Thus, supplied oil passes through the inside of the top half of the first coil end 25 (see dashed arrows Lx in FIG. 26A), so that parts of the oil enter in the clearance CL. That is, parts of the oil falling through the inside of the upper half part of the first coil end 25 are recovered by the oil recovery sheet 50.

Thereafter, the parts of the oil recovered in the clearance CL flow along the outer surface of the oil recovery sheet 50 while being in contact with the inner periphery of the first coil end 25 up to the bottom of the first coil end 25. This efficiently cools the bottom half of the first coil end 25 in addition to the top half thereof.

While the oil is guided to flow along the outer surface of the oil recovery sheet 50 in the bottom half of the first coil end 25, parts of the oil fall by their gravities through the bottom half of the first coil end 25 (see dashed arrows in FIG. 26B). This more efficiently cools the bottom half of the first coil end 25.

The oil recovering and guiding functions of the oil recovery sheet 50 of the rotary electric machine 9 for the second coil end 25 can be identical to those of the oil recovery sheet 50 for the first coil end 25.

Figure 27:
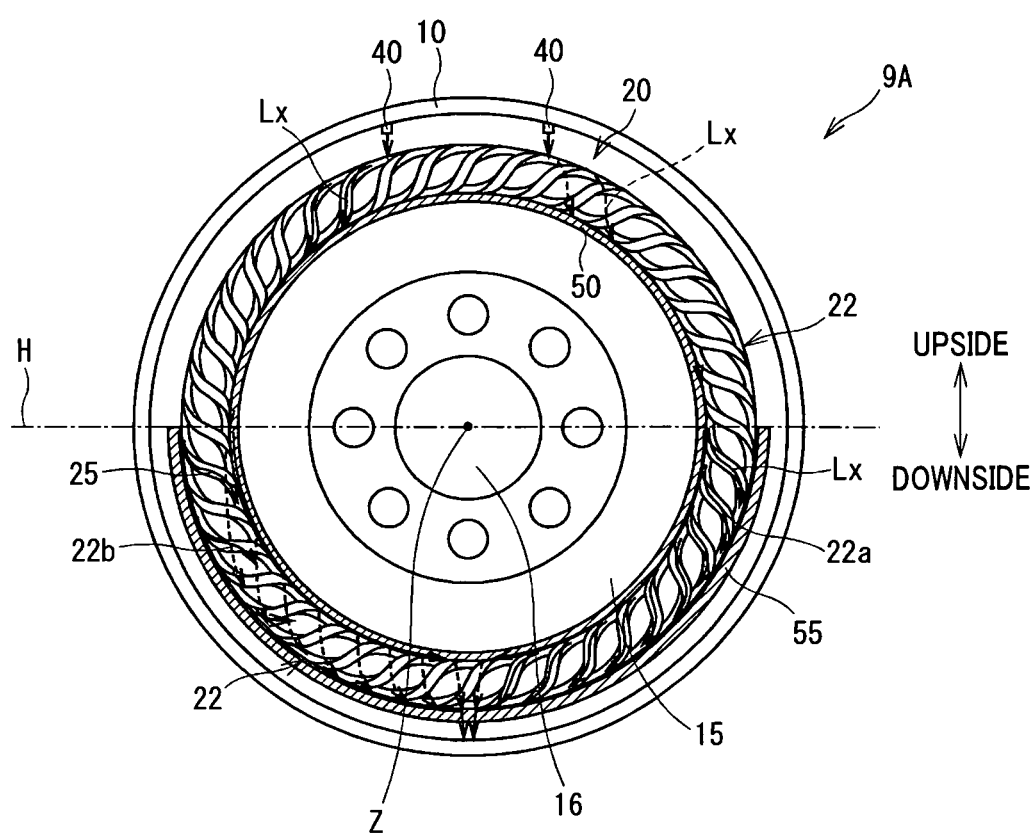
FIG. 27 is a schematic enlarged view of the first coil end of a rotary electric machine according to a second modification of the fourth embodiment of the present disclosure.

FIG. 27 is a schematic enlarged view of the first coil end 25 of a rotary electric machine 9A according to a second modification of the fourth embodiment of the present disclosure.

The rotary electric machine 9A according to the seventh embodiment is comprised of the pair of cylindrical oil recovery sheets 50 and the pair of cylindrical oil recovery sheets 55 without provided with the pair of oil guides 35. Each of the oil recovery sheets 50 is placed over the radially inner portion of a corresponding one of the first and second coil ends 25 with a clearance CL therebetween. Each of the oil recovery sheets 55 is placed over the radially outer portion of the bottom half of a corresponding one of the first and second coil ends 25 with a clearance therebetween.

With the configuration of the rotary electric machine 9A, if the flow rate of oil supplied from each oil supply 40 above the first coil end 25 is relatively high, after passing through the first coil end 25 (see arrows Lx1), the oil is recovered by the oil recovery sheet 50, and thereafter flows along the outer surface of the oil recovery sheet 50 while being in contact with the inner periphery of the first coil end 25 up to the bottom of the first coil end 25. While the oil is guided to flow along the outer surface of the oil recovery sheet 50 in the bottom half of the first coil end 25, parts of the oil fall by their gravities through the bottom half of the first coil end 25 (see arrows Lx and dashed arrows in FIG. 27).

In addition, if an alternative part of the oil falling along the outer periphery of the top half of the first coil end 25 drops downward, the oil is recovered by the oil recovery sheet 55, and the recovered oil is guided along the inner surface of the oil recovery sheet 55 up to the bottom of the first coil end 25 while being in contact with the outer periphery of the first coil end 25. A part of the oil being guided along the inner surface of the oil recovery sheet 55 flows through some of the turn portions of the bottom half of the first coil end 25; these turn portions are directed downward.

Thus, the rotary electric machine 9A according to the second modification achieves sufficient cooling capability for the coil ends 25 even if the flow rate of oil supplied from the oil supplies 40 is high.

In order to improve work efficiency of the rotary electric machine according to the second modification for placement of the oil recovery sheet 50 and the oil recovery sheet 55 on or over each of the first and second coil ends 25, a pair of guide assemblies 660 each constructed by a combination of the oil recovery sheet 50 and the oil recovery sheet 55 can be used.

Figure 28:
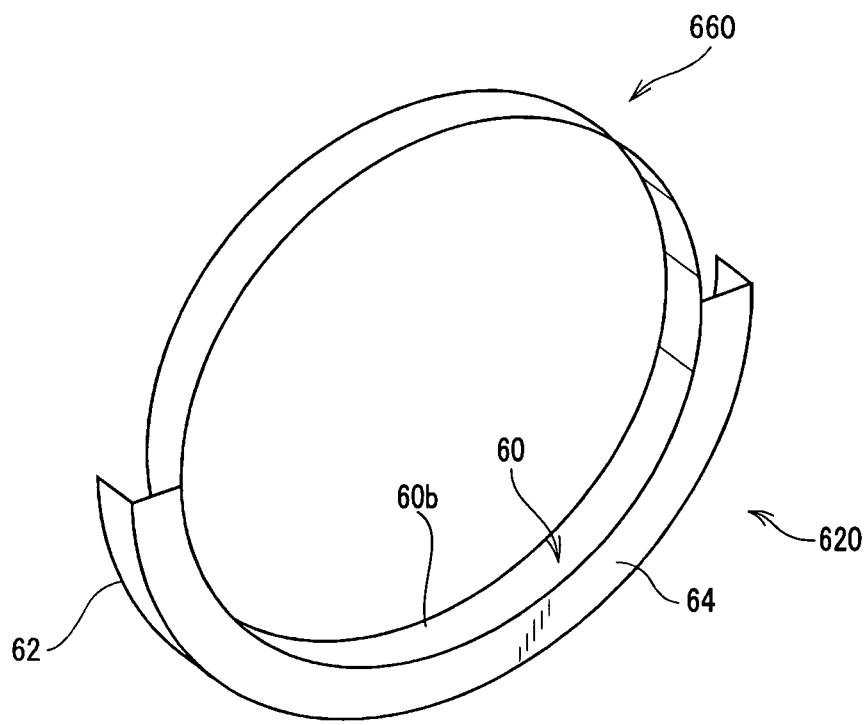
FIG. 28 is a schematic enlarged perspective view of a guide assembly that can be used in the second modification.

FIG. 28 is a schematic enlarged perspective view of a guide assembly 660.

As illustrated in FIG. 28, the guide assembly 660 is a cylindrical integrated molded product. Specifically, the guide assembly 660 consists of a cylindrical base wall 60, a third wall 63, and a fourth wall 64. The cylindrical base wall 60 has a size fittable in the inner periphery of each of the first and second coil ends 25 with the clearance CL therebetween.

The fourth wall 64 has a semi-circular ring shape with a curvature that is the same as a lower half segment 60b of the base wall 60. The fourth wall 64 continuously extends outwardly from one edge of the segment 60b of the base wall 60 to be orthogonal to the segment 60b of the base wall 60. The third wall 63 has a circular arc shape with a curvature that is the same as the segment 60b of the base wall 60, and continuously extends from one outer edge of the fourth wall 64 to be orthogonal to the fourth wall 64 and to be opposite to the segment 60b of the base wall 60. That is, the segment 60b of the base wall 60, the third wall 63, and the fourth wall 64 constitute a second composite component 620 with a substantially U-shape in an axial cross section of the base wall 60.

After the stator 20 is installed in the housing 10 such that the center axis Z of the stator 20 is directed horizontally, the guide assembly 660 is attached from radially outward of the first coil end 25 such that: the base wall 60 is fitted in the inner periphery of the coil end 25 with the clearance CL, and the second wall 63 is placed on or over the bottom half of the coil end 25. This makes it easy to serve the third wall 63 as the oil recovery sheet 55, and the base wall 60 as the oil recovery sheet 50.

As described above, the rotary electric machine according to the second modification can be provided with the guide assembly 660 that serves as the oil recovery sheet 50 and the oil recovery sheet 55; this guide assembly 660 is easily attached to one coil end 25 as compared with when the oil recovery sheet 50 and the oil recovery sheet 55 are individually attached to one coil end 25. This results in improvement of the attachment work of oil recovery sheet 50 and the oil recovery sheet 55 to one coil end 25.

From the rotary electric machine according to the eighth embodiment, the pair of oil guides 75 can be eliminated. This third modification of the rotary electric machine according to the eighth embodiment can supply oil to the top portion of the first coil end 25 mainly through the second passage 412 or the third passage 413 even if the center axis Z of the rotary electric machine 7 parallel to the front-back direction of the vehicle is inclined with respect to the horizontal direction with its front side up and its rear side down, or its front side down and its rear side up. Thus, it is possible to stably supply oil to the first coil end 25 of the stator coil 22 even if the center axis Z of the rotary electric machine 7 is inclined with respect to the front-back direction of the vehicle. This more improves robust performance of the third modification of the rotary electric machine according to the eighth embodiment.

Figure 29:
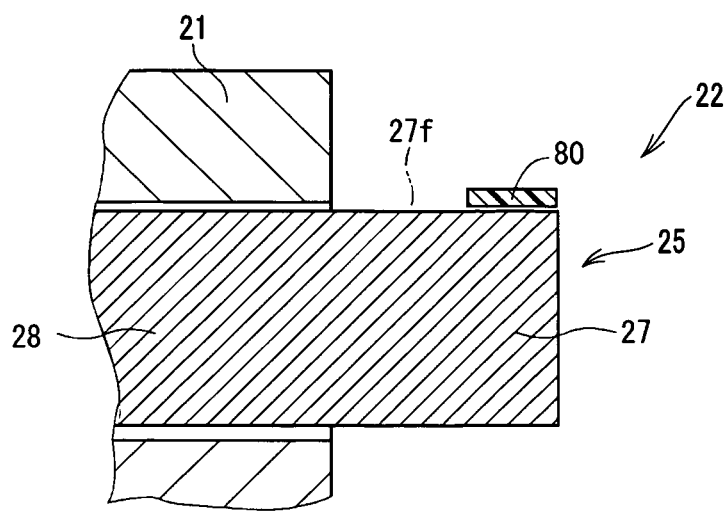
FIG. 29 is an axial cross sectional view schematically illustrating a U-shaped turn portion and a corresponding one in-slot portion of a stator coil according to another modification of each of the first to eighth embodiments.

FIG. 29 schematically illustrates a U-shaped turn portion 27 and a corresponding one in-slot portion 28 of a stator coil. The collection of a lot of the turn portions 27 axially projecting from the stator core 21 provides the first coil end 25 of the stator coil 22. Each of the turn portions 27 has a constant outer diameter about the axial direction of the stator coil 22, and the radially outer most portion 27*f* of each of the turn portions 27 is formed to be flat in the axial direction of the stator coil 22. An oil guide 80 is placed to cover the first coil end 25 from its radially outward. The oil guide 80 can be comprised of a number of first threadlike members and second threadlike members fixedly joined thereto with, for example, an impregnating material to provide a plurality of windows therebetween (see FIG. 3A).

An oil guide and/or an oil recovery sheet according to the present disclosure can be provided for only one of the first and second coil ends of a rotary electric machine.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A rotary electric machine comprising:
a rotor;
a stator comprising:
 a stator core in which the rotor is installed to be rotatable about a preset rotation axis, the stator core having a plurality of slots in a circumferential direction of the stator core about the rotation axis; and
 a stator coil comprising: a plurality of in-slot portions each contained in a corresponding one of the plurality of slots, and a plurality of turn portions, each of the plurality of turn portions connecting one end of a corresponding one of the plurality of in-slot portions, which projects from one axial end of the stator core, with one end of a corresponding to another of the plurality of in-slot portions, which projects the one axial end of the stator core, the plurality of turn portions providing an end portion of the stator coil; and
a coolant guide placed to cover at least a circumferential outer part of the end portion of the stator coil from radially outside of the end portion and provided with a plurality of holes therethrough, the coolant guide being configured to guide a coolant therealong in a circumferential direction of the end portion of the stator coil while guiding, through the plurality of holes, a part of the coolant as a first coolant to the end portion of the stator coil,
wherein the coolant guide is placed a predetermined distance from the end portion of the stator coil to allow the first coolant to flow between the coolant guide and the end portion of the stator coil, so that the first coolant is guided by the coolant guide while a part of the first coolant is in contact with the coolant guide, and
a housing in which the stator and the rotor are installed, the housing comprising a coolant supplier configured to supply the coolant to the coolant guide,
wherein the coolant supplier comprises:
a frame having a first wall and a second wall opposite thereto, the second wall facing the coolant guide, the second wall being formed therethrough with at least first, second, and third outlets, the second outlet being arranged at one side of the first outlet in a direction of the rotation axis, the third outlet being arranged at the other side of the first outlet in the direction of the rotation axis;
a coolant container formed in the first wall in which the coolant is supplied, the coolant container having a bottom wall, the bottom wall being formed therethrough with at least first, second, and third inlets, the second inlet being arranged at the other side of the first outlet in the direction of the rotation axis, the third outlet being arranged at the one side of the first outlet in the direction of the rotation axis; and
at least first second, and third passages, the first passage being formed such that the first inlet communicates with the first outlet, the second passage being formed such that the second inlet communicates with the second outlet, the third passage being formed to allow the third inlet communicates with the third outlet.

2. The rotary electric machine according to claim 1, wherein the coolant guide comprises a plurality of threadlike members joined to each other to provide, as the plurality of holes, a plurality of windows therebetween.

3. The rotary electric machine according to claim 2, wherein the plurality of threadlike members are joined to each other to have a mesh configuration.

4. The rotary electric machine according to claim 1, wherein the coolant guide comprises a platy member extending in a circumferential direction of the end portion of the stator core, and the plurality of holes formed through the platy member.

5. The rotary electric machine according to claim 4, wherein a number of the plurality of holes is greater than a number of the plurality of turn portions of the end portion of the stator coil.

6. The rotary electric machine according to claim 4, wherein the platy member has a portion to which the coolant is directly supplied, a density of the plurality of holes at the portion of the platy member is higher than another portion of the platy member.

7. The rotary electric machine according to claim 1, wherein the coolant supplier is provided with a coolant supply port having a first width in a direction of the rotation axis and a second width in a radial direction of the end portion of the stator coil, the first width being wider than the second width.

8. The rotary electric machine according to claim 1, wherein the coolant supplier is provided with a coolant supply port directed outward in a tangential direction of a corresponding radially outer portion of the coolant guide.

9. The rotary electric machine according to claim 1, wherein the coolant guide comprises a platy member extending in a circumferential direction of the end portion of the stator coil, the platy member is provided with a groove between both circumferential edges thereof, the groove comprising:
   a bottom portion of the platy member placed to face the coolant supplier, the plurality of holes being formed through the bottom portion; and
   a pair of inclined sides each extending obliquely downward from a corresponding one of the circumferential edges up to the bottom portion.

10. The rotary electric machine according to claim 9, wherein the platy member is provided with a block wall projecting radially outward from an end of at least one of the circumferential edges.

11. The rotary electric machine according to claim 1, wherein the first passage is orthogonal to the direction of the rotation axis.

12. The rotary electric machine according to claim 1, wherein the first passage has a symmetrical shape about a center axis orthogonal to the direction of the rotation axis, and a projected portion of the second passage on an imaginary plane passing through the center axis of the first passage in parallel to the direction of the rotation axis and a projected portion of the third passage on the imaginary plane are symmetric with each other about the center axis of the first passage.

13. The rotary electric machine according to claim 1, wherein the coolant guide has a first width in the direction of the rotation axis, and the end portion of the stator coil has a second width in the direction of the rotation axis, the first width being substantially identical to the second width.

14. The rotary electric machine according to claim 13, wherein the coolant guide comprises:
   a base member through which the plurality of holes are formed, the base member extending in a circumferential direction of the end portion of the stator coil, and
   a block wall mounted on at least one of circumferential side portions of the coolant guide and projecting radially outward to the oil supply.

15. A rotary electric machine comprising:
   a rotor;
   a stator comprising:
      a stator core in which the rotor is installed to be rotatable about a preset rotation axis, the stator core having a plurality of slots in a circumferential direction of the stator core about the rotation axis; and
      a stator coil comprising: a plurality of in-slot portions each contained in a corresponding one of the plurality of slots, and a plurality of turn portions, each of the plurality of turn portions connecting one end of a corresponding one of the plurality of in-slot portions, which projects from one axial end of the stator core, with one end of a corresponding to another of the plurality of in-slot portions, which projects the one axial end of the stator core, the plurality of turn portions providing an end portion of the stator coil; and
   a coolant guide placed to cover at least a circumferential outer part of the end portion of the stator coil from radially outside of the end portion and provided with a plurality of holes therethrough, the coolant guide being configured to guide a coolant therealong in a circumferential direction of the end portion of the stator coil while guiding, through the plurality of holes, a part of the coolant as a first coolant to the end portion of the stator coil,
   a first coolant recovery member placed to cover an inner periphery of the end portion of the stator coil and configured to recover the first coolant that having passed through the end portion of the stator coil and to allow the recovered part of the first coolant to flow therealong, wherein the first coolant recovery member is configured to entirely block the first coolant from passing therethrough,
   wherein the rotation axis is arranged to be horizontally, and the coolant guide is placed to cover a top part of the end portion of the stator core over a horizontal reference plane as the circumferential outer part, the horizontal reference plane horizontally extending and passing through the rotation axis, the coolant guide having circumferential edges and providing a space between each of the circumferential edges thereof and the horizontal reference plane, and
   a second coolant recovery member placed over an outer periphery of a bottom part of the end portion of the stator coil below the horizontal reference plane and configured to recover an alternative part of the coolant guided on the coolant guide and falling through at least one of the spaces.

16. The rotary electric machine according to claim 15, wherein a projected position of each of the circumferential edges of the coolant guide on the horizontal reference plane is located between the inner periphery of the end portion of the stator coil on the horizontal reference plane and an outer surface of the end portion of the stator coil on the horizontal reference plane.

17. The rotary electric machine according to claim 15, wherein the coolant guide and the first coolant recovery member are constructed as an assembly comprising a cylindrical base wall, a first wall, and a second wall, the second wall continuously extending outwardly from one edge of a segment of the base wall, the first wall continuously extending from one outer edge of the second wall to be opposite to the segment of the base wall, the base wall being fitted in the inner surface of the end portion of the stator coil with a clearance to serve the first recovery member, the first wall being placed to cover the top part of the end portion of the stator core to serve the coolant guide, the second wall being placed to cover an axial end of the top part of the end portion of the stator core.

18. The rotary electric machine according to claim 15, wherein the first and second coolant recovery members are constructed as an assembly comprising a cylindrical base wall, a third wall, and a fourth wall, the fourth wall continuously extending outwardly from one edge of a segment of the base wall, the third wall continuously extending from one outer edge of the fourth wall to be opposite to the segment of the base wall, the base wall being fitted in the inner periphery of the end portion of the stator coil with a clearance to serve the first recovery member, the third wall being placed to cover the bottom part of the end portion of the stator core to serve the second recovery member, the fourth wall being placed to cover an axial end of the bottom part of the end portion of the stator core.

19. The rotary electric machine according to claim 15, wherein the coolant guide, the first coolant recovery member, and the second coolant recovery member are constructed as an assembly comprising a cylindrical base wall, a first wall, a second wall, a third wall, and a fourth wall, the second wall continuously extending outwardly from one edge of one segment of the base wall, the first wall continuously extending from one outer edge of the second wall to be opposite to the segment of the base wall, the fourth wall continuously extending outwardly from one edge of an alternative segment of the base wall, the alternative segment facing the one segment, the third wall continuously extending from one outer edge of the fourth wall to be opposite to the alternative segment of the base wall, the base wall being fitted in the inner periphery of the end portion of the stator coil with a clearance to serve the first recovery member, the first wall being placed to cover the top part of the end portion of the stator core to serve the coolant guide, the second wall being placed to cover an axial end of the top part of the end portion of the stator core, the third wall being placed to cover the bottom part of the end portion of the stator core to serve the second recovery member, the fourth wall being placed to cover an axial end of the bottom part of the end portion of the stator core.

20. A rotary electric machine comprising:
   a rotor;
   a stator comprising:
      a stator core in which the rotor is installed to be rotatable about a preset rotation axis, the stator core having a plurality of slots in a circumferential direction of the stator core about the rotation axis; and
      a stator coil comprising: a plurality of in-slot portions each contained in a corresponding one of the plurality of slots, and a plurality of turn portions each connecting one end of a corresponding one of the plurality of in-slot portions projecting from one axial end of the stator core with one end of a corresponding alternative one of the plurality of in-slot portions projecting the one axial end of the stator core, the plurality of turn portions providing an end portion of the stator coil; and
   a coolant guide placed to cover at least a circumferential outer part of the end portion of the stator coil from radially outside of the end portion and configured to guide a coolant therealong with a first resistance of flow, and guide a part of the coolant therethrough with a second resistance of flow, the second resistance of flow being greater than the first resistance of flow,
   wherein the coolant guide is placed a predetermined distance from the end portion of the stator to allow the coolant to flow between the coolant guide and the end portion of the stator coil, so that the coolant is guided by the coolant guide while a part of the coolant is in contact with the coolant guide,
   a housing in which the stator and the rotor are installed, the housing comprising a coolant supplier configured to supply the coolant to the coolant guide,
   wherein the coolant supplier comprises:
   a frame having a first wall and a second wall opposite thereto, the second wall facing the coolant guide, the second wall being formed therethrough with at least first, second, and third outlets, the second outlet being arranged at one side of the first outlet in a direction of the rotation axis, the third outlet being arranged at the other side of the first outlet in the direction of the rotation axis;
   a coolant container formed in the first wall in which the coolant is supplied, the coolant container having a bottom wall, the bottom wall being formed therethrough with at least first, second, and third inlets, the second inlet being arranged at the other side of the first outlet in the direction of the rotation axis, the third outlet being arranged at the one side of the first outlet in the direction of the rotation axis; and
   at least first second, and third passages, the first passage being formed such that the first inlet communicates with the first outlet, the second passage being formed such that the second inlet communicates with the second outlet, the third passage being formed to allow the third inlet communicates with the third outlet.

* * * * *